US008019169B2

(12) United States Patent
Kondo

(10) Patent No.: US 8,019,169 B2
(45) Date of Patent: Sep. 13, 2011

(54) IMAGE CODING APPARATUS, IMAGE DECODING APPARATUS, IMAGE PROCESSING APPARATUS AND METHODS THEREOF

(75) Inventor: Satoshi Kondo, Kyoto (JP)

(73) Assignee: Panasonic Corporation, Osaka (JP)

( * ) Notice: Subject to any disclaimer, the term of this patent is extended or adjusted under 35 U.S.C. 154(b) by 911 days.

(21) Appl. No.: 12/014,895

(22) Filed: Jan. 16, 2008

(65) Prior Publication Data

US 2008/0175491 A1 Jul. 24, 2008

(30) Foreign Application Priority Data

Jan. 18, 2007 (JP) ................................. 2007-008833
Jan. 18, 2007 (JP) ................................. 2007-008834
Jan. 18, 2007 (JP) ................................. 2007-008835

(51) Int. Cl.
*G06K 9/36* (2006.01)

(52) U.S. Cl. ......... 382/236; 382/232; 382/233; 382/238

(58) Field of Classification Search .................. 382/233, 382/238, 246, 236, 232; 348/409.1; 358/426.13, 358/426.02; 712/23, 206, 212; 714/755, 714/752; 375/308, 240.08, E7.084, E7.086; 708/203

See application file for complete search history.

(56) References Cited

U.S. PATENT DOCUMENTS 4,794,401 A 12/1988 Murashima .................... 343/761
5,983,251 A * 11/1999 Martens et al. ............... 708/203

OTHER PUBLICATIONS

ITU-T Rec. T-81, "Information Technology—Digital Compression and Coding of Continuous-Tone Still Images—Requirements and Guidelines", 1992.
I. Drori et al., "Fragment-based image completion", Proceedings of ACM SIGGRAPH 2003, pp. 303-312.
A. Hertzman et al., "Image Analogies", SIGGRAPH 2001 Conference Proceedings.
S. Baker et al., "Limits on Super-Resolution and How to Break Them", IEEE Transactions on Pattern Analysis and Machine Intelligence, vol. 24, No. 9, pp. 1167-1183, Sep. 2002 (re-printed as an Abstract / Title page plus pp. 1-35).
W. T. Freeman, "Example-Based Super-Resolution", Mitsubishi Electric Research Laboratory, TR-2001-30, Aug. 2001—corresponding to Example-Based Super-Resolution, IEEE Computer Graphics and Applications, vol. 22, No. 2, pp. 56-65, Mar./Apr. 2002.

* cited by examiner

*Primary Examiner* — Anh Hong Do
(74) *Attorney, Agent, or Firm* — Wenderoth, Lind & Ponack, L.L.P.

(57) ABSTRACT

The image coding apparatus according to the present invention includes: a similar image search unit 201 which searches at least one second still image which is similar to a first still image; a coding processing unit 202 which generates a predictive image for the first still image using the at least one second still image as the reference image, and codes the difference between the first still image and the predictive image; and a reference image information processing unit 204 which adds information which indicates the location of at least one of the second still image to the bit stream.

25 Claims, 29 Drawing Sheets

Direction of prediction=0

Direction of prediction=4

Input image

Reference image

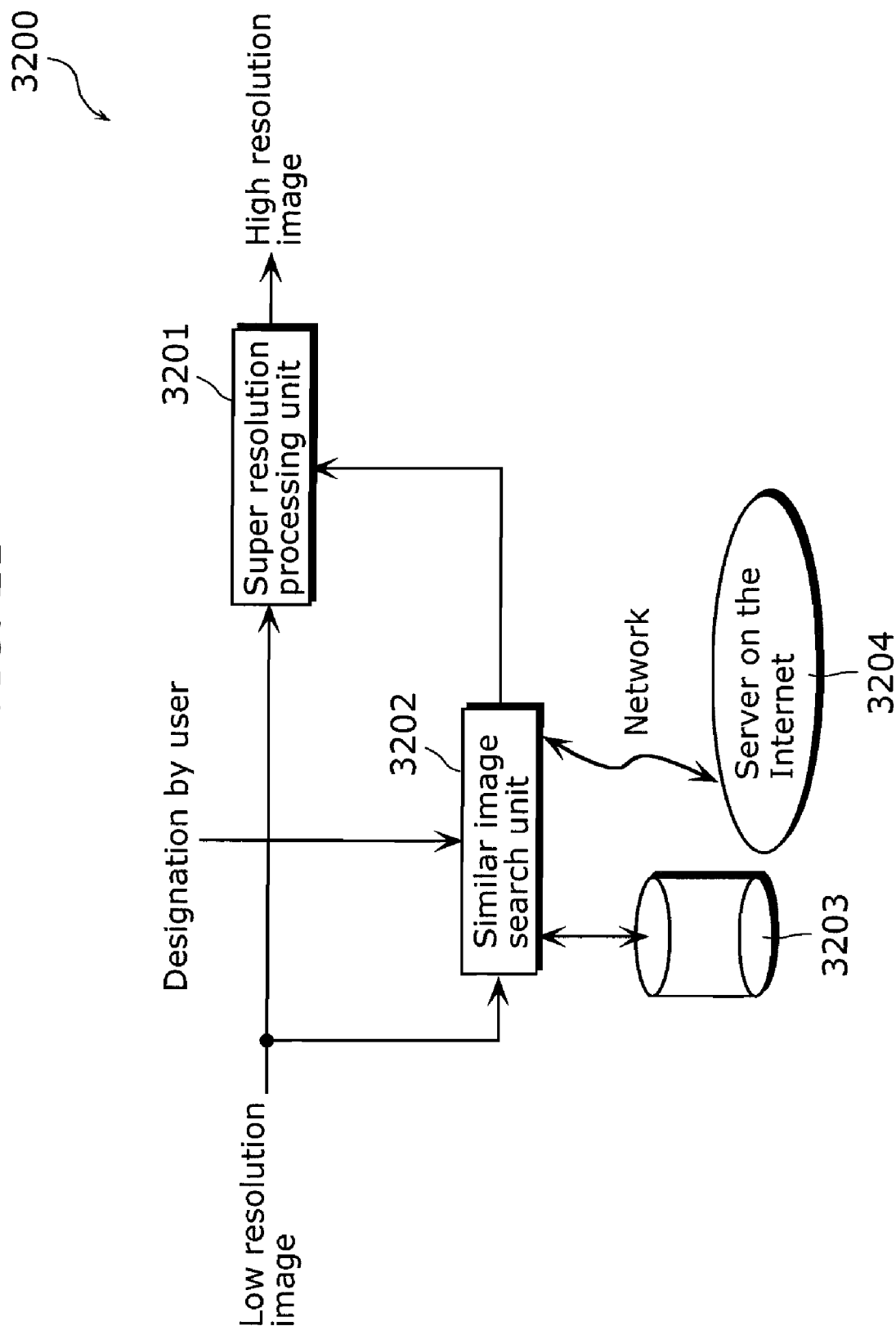

IMAGE CODING APPARATUS, IMAGE DECODING APPARATUS, IMAGE PROCESSING APPARATUS AND METHODS THEREOF

BACKGROUND OF THE INVENTION (1) Field of the Invention

The present invention relates to an image coding apparatus which compresses a still image with high efficiency, an image decoding apparatus, an image processing apparatus and methods thereof.

(2) Description of the Related Art

As a method for compression coding a still image with high efficiency, the JPEG and the JPEG 2000 are set as standards (for example, see ITU-T Rec. T.81, Information Technology—Digital Compression and Coding of Continuous-Tone Still Images—, 1992.). In addition, the moving picture coding standards such as MPEG-2, H.264 and others employs an intra coding method in which the image which is to be an access point is coded without referring to other image is used.

An image completion method for generating a completed image by removing a part of image from the image taken by a digital camera and the like and covering the removed part with completion pixels (For example, I. Drori, D. Chohen-Or, H. Yeshurun, "Fragment-based image completion", Proceedings of ACM SIGGRAPH 2003, pp. 303-312 (2003)). In the conventional methods, a similar part is searched from the part other than removed part in an image, and the removed part is filled using the pixels in the similar part.

The super resolution image processing has been proposed as another image processing method. The super resolution image processing is a method for generating a highly accurate high resolution image by generating high-frequency content which is not included in a low resolution image, and adding the high-frequency component to the low resolution image. As examples of the super resolution image processing, methods in which present high resolution image is used as an example (For example, A. Hertzmann, C. Jacobs, N. Oliver, B. Curless, D. Salesin, "Image Analogies", SIGGRAPH 2001 Conference Proceedings, and S. Baker and T. Kanade, "Limits on Super-Resolution and How to Break Them", IEEE Transactions on Pattern Analysis and Machine Intelligence, Vol. 24, No. 9, Pages: 1167-1183-, September 2002.) and a method in which a transformation table from a low resolution image to high resolution image have been proposed (For example, W. T. Freeman, T. R. Jones and E. C. Pasztor, "Example-based Super-Resolution," IEEE Computer Graphics and Applications, Vol. 22, No. 2, pp. 56-65, March/April 2002).

SUMMARY OF THE INVENTION

The still image coding methods and intra image coding methods have a problem that coding is less efficient (the compression rate is lower) than the inter prediction coding method using the motion compensation which is adapted to the MPEG-2 and the H.264.

In the conventional image completion methods, a relatively natural completion image can be obtained when the removed part is to be completed with a flat image and when the removed part is to be completed with a textured image in the part which is not removed. However, when the removed part is to be completed with an image in a complex shape and when the removed part is to be completed with an image which does not exist in the non-removed part, there is another problem that the completed image results in an unnatural image.

The conventional super resolution image processing requires an example high resolution image and a transformation table. The example high resolution image and the transformation table have to be an image close to a low resolution image and a transformation table suitable for the low resolution image, respectively. However, in the references above, it is assumed that the model high resolution image is obtained in advance, or transformation table is also generated in advance, and none refers to a method for obtaining an example high resolution image. Consequently, there is a problem with the conventional super resolution image processing method that a high resolution image with enough resolution cannot be obtained when the super resolution image processing is performed on a typical low resolution image.

It is an object of the present invention to propose an image coding method and an image decoding method which can dramatically improve coding efficiency (increase the compression rate) compared to the conventional method when coding an image which is conventionally coded using the intra coding, the image being a still image or in a moving picture.

It is another object of the present invention to propose an image processing method in which a natural completed image can be generated in the case where a completed image is generated by deleting a part of image from the image taken by a digital camera and the like and by compensating the removed part with completion pixels even when the removed part is to be completed with an image having a complex shape, or when the removed part is completed with an image which does not exist in the non-removed part.

It is another object of the present invention to propose an image processing method in which high-performance super resolution image processing can be implemented even when the example high-resolution image is not obtained in advance.

In order to achieve the object, the image coding apparatus according to the present invention includes a search unit which searches at least one second still image which is similar to a first still image from a group of images; a coding unit which generates a predictive image for the first still image using the at least one second still image as a reference image and to generate a bit stream by coding a difference between the first still image and the predictive image; and an addition unit which adds, to the bit stream, information which indicates a location of the at least one second still image. With this configuration, the first still image is not coded itself, but the difference between the similar second still image is coded, and thus the coding efficiency can be dramatically improved (the compression rate is increased). In addition, by adding information to the bit stream ensures complete decoding in the image decoding apparatus.

Here, it is preferable that each of the at least one second still image includes a partial image of a subject corresponding to a subject image in the first still image.

With this configuration, it is possible to further improve the compression rate since this configuration increases the degree of similarity of the second still image for the first still image.

Here, the image coding apparatus may further include a transformation unit operable to perform a transformation processing on the second still image, in which the transformation processing is processing for transforming the second still image so as to match at least one of a size of the partial image and an imaging angle with the size of the subject image and an imaging angle, the coding unit generates the bit stream by performing a predictive coding on the first still image using the transformed image similar to the second still image as a reference image, and the addition unit adds, to the bit stream, transformation information which indicates the transformation processing performed on the second still image.

With this configuration, at least one of the size of the partial image in the second still image and the imaging angle is matched to the subject image in the first still image, and thus the degree of similarity between the second still image and the first still image can be increased. Therefore, the compression rate can be improved further.

Here, the image coding apparatus may further include a storage unit which stores a plurality of still images, in which the search unit searches the second still image from the group of images which includes the plurality of still images stored in the storage unit.

With this configuration, the search unit searches the second still image from the same device in which the first still image is held. Thus, the search can be performed in a relatively shorter time than the search on the Internet and the risk of losing the second still image can be avoided.

Here, the search unit may search the second still image from the group of images which includes still images on the Internet.

With this configuration, it is possible to increase the possibility of finding the second still picture of a higher degree of similarity.

Here, the search unit may include: a degree-of-similarity computation unit which computes a degree of similarity between each of candidate images included in the group of images and the first still image; and a determination unit which determines the at least one second still image from the candidate images in order of the degree of similarity.

With this configuration, the compression rate can be dramatically increased by raising the threshold value; the search time can be shortened by lowering the threshold value.

Here, the degree of similarity computation unit may: extract a plurality of first feature points each of which represents a feature of the first still image; extract a plurality of second feature points each of which represents a feature of the candidate image; judge pairs each of which is a pair of one of the first feature points and one of the second feature points which correspond each other; and compute the degree of similarity in such a manner that the more the number of pairs is, the higher the degree of similarity becomes.

With this configuration, the degree of similarity is computed by the number of pairs, it is suitable for speeding up the process.

Here, the degree of similarity computation unit may: extract a plurality of first feature points each of which represents a feature of the first still image; extract a plurality of second feature points each of which represents a feature of the candidate image; judge pairs, each of which is a pair of one of the first feature points and one of the second feature points which correspond each other; and compute the transformation matrix, based on the pairs, for transforming each of the candidate images so that at least one of a size of the candidate image and an imaging angle of the candidate image matches the size of the first still image and the imaging angle of the first still image; and compute the degree of similarity in such a manner that the smaller the degree of transformation in the transformation is, the higher the degree of similarity becomes.

With this configuration, at least one of the size of the partial image in the second still image and the imaging angle is matched to the first still image, and thus a higher compression rate can be realized.

Here, the degree of similarity computation unit may: extract a plurality of first feature points each of which represents a feature of the first still image; extract a plurality of second feature points each of which represents a feature of the candidate image; judge pairs, each of which is a pair of one of the first feature points and one of the second feature points which correspond each other; compute the transformation matrix, based on the pairs, for transforming each of the candidate images so that at least one of the size of the candidate image and the imaging angle of the candidate image matches the size of the first still image and the imaging angle; and compute the degree of similarity in such a manner that the larger the number of pairs and the smaller the degree of transformation are, the higher the degree of similarity becomes.

This configuration improves calculation accuracy in computing the degree of similarity, a higher compression rate can be realized.

Here, the search unit may search each of candidate images included in the group of images based on metadata, and the metadata includes at least one of a keyword, imaging location information, and imaging date information.

With this configuration, the time required for the search can be shortened and thus a process time from the search to coding can be shortened.

Here, the search unit may exclude a still image coded using another still image as a reference image from the at least one second still image.

This configuration prevents reference in two steps or more, and thus complex processing can be prevented. To put it differently, when the second reference image is coded with reference to other images, the image referred to by the reference image has to be obtained in order to perform coding, resulting in complex processing, however this configuration prevents such a complex process from occurring.

Here, the coding unit may code the first still image on a block-by-block basis, and at least one block is coded in the predictive coding of the moving picture coding method using one of the second still images as the reference image.

With this configuration, it is possible to decrease the cost for developing and manufacturing the apparatus by diverting a part of, or all of the software property and the hardware property for the conventional moving picture compression coding.

Here, the coding unit may include: a reference memory in which the at least one of second still image is stored; a motion vector detection unit operable to detect a motion vector of the at least one block using the second still image in the reference memory as the reference image; a subtraction unit operable to compute a difference between the at least one block and a predictive image as prediction residual, the predictive image obtained from the reference image based on the motion vector; and a variable length coding unit operable to perform a variable coding on the prediction residual and the motion vector.

This configuration facilitates developing and manufacturing the apparatus by diverting a part of, or all of the software property and the hardware property for the conventional moving picture compression coding.

Here, the coding unit may code the first still image on a block-by-block basis, and at least one block is coded in the bi-predictive coding of the moving picture coding method using two of the second still images as reference images.

With this configuration, it is possible to decrease the cost for developing and manufacturing the device by diverting a part of, or all of the software property and the hardware property for the conventional moving picture compression coding.

Here, the image coding apparatus may further include: a reception unit operable to receive a delete instruction for deleting the still image stored in the storage unit; a judging unit operable to judge whether or not there is another still image coded using the still image which is a subject of the delete instruction, and a notification unit operable to notify, when it is judged that there is the another still image, that there is the another still image.

Here, the image coding apparatus may further include a deletion unit which deletes the still image when the reception unit receives the delete instruction again, in response to the notification.

With this configuration, when the still image to be deleted is used as a reference image, accidental deletion of the still image can be prevented.

Here, the image coding apparatus may further include: a designation unit which designates a first area in the first still image; a specifying unit which specifies a second area in the second still image corresponding to the first area; and a completion unit which removes pixels in the first area and complete the removed first area with the pixels in the second area, in which the coding unit codes the first still image on which the completion is performed by the completion unit.

With this configuration, even when the removed part is to be completed with an image in a complex shape or when the removed part is to be completed with an image which does not exist in the non-removed part, it is possible to generate a natural completed image and dramatically improve the compression rate in coding.

Here, the image coding apparatus may further include a super resolution unit which changes a resolution of the first still image to a higher resolution using at least one of the second still image as a reference image, in which the coding unit is operable to code the first still image of which the resolution is changed to a high resolution.

The first still image can be adjusted to a high resolution, and furthermore, can be coded at a higher compression rate. For example, although the first still image is adjusted to a high resolution, the file size after coding can be reduced.

The image decoding apparatus according to the present invention includes: an acquisition unit which acquires a bit stream and additional information which indicates a first still image, an image acquisition unit which acquires a second still image indicated in the additional information; and a decoding unit which generates a predictive image for the first image using the second still image as a reference image, and outputs the first still image by adding a prediction residual obtained from the bit stream indicating the first image and the predictive image.

With this configuration, the bit stream of the first still image coded at a high compression rate can be decoded with the image coding apparatus and the method according to the present invention.

The image coding method, the image decoding method, and the semiconductor device according to the present invention includes the same configuration as the image coding apparatus and the image decoding apparatus.

In addition, the image processing apparatus which achieves another object above includes: a search unit which searches at least one second still image which is similar to a first still image from a group of images; a designation unit which designates a first area in the first still image; a specifying unit which specifies a second area in the second still image corresponding to the first area; and a completion unit which removes pixels in the first area and complete the removed first area with the pixels in the second area.

With this configuration, the image processing apparatus according to the present invention can generate a natural completed image when a completed image is generated by removing a part of image from an image taken by a digital camera and the like, and filling the removed part with completed pixels, even when the removed part is to be completed with an image having a complex shape, or when the removed part is completed with an image which does not exist in the non-removed part.

Furthermore, the image processing apparatus which achieves another object above includes: a search unit which searches at least one second still image which is similar to a first still image from a group of images, and a super resolution unit which changes a resolution of the first still image to a higher resolution using the at least one second still image as a reference image.

With this configuration, the resolution of the low resolution image into a high resolution even when an example high resolution image is not obtained in advance.

Note that the present invention can be realized not only as the image coding apparatus and method, the image decoding method and the data management method, but also as a method including steps in the image coding method, the image decoding method, and the data management method or a program which causes a computer to execute these steps. It is needless to say that such a program can be distributed via the recording medium such as a CD-ROM and transmission media such as the Internet.

As described above, according to the image coding apparatus and the image coding method in the present invention, coding efficiency can be dramatically improved (increase the compression rate).

In addition, it is possible to increase the degree of similarity among the second still image and the first still image, the compression rate can be further improved.

The risk of losing the second still picture can be avoided.

It is possible to increase the possibility of finding the second still picture of a higher degree of similarity.

By raising the threshold, the compression rate can be dramatically increased, while search time can be shortened by lowering the threshold value.

It is possible to decrease the cost for developing and manufacturing the apparatus by diverting a part of, or all of the software property and the hardware property for the conventional moving picture compression coding.

It is possible to prevent the second still picture to be used as the reference image from being accidentally deleted.

Even when the removed part is to be completed with an image in a complex shape or when the removed part is to be completed with an image which does not exist in the non-removed part, it is possible to generate a natural completed image and dramatically improve the compression rate in coding.

The resolution of the first still image can be changed to a high resolution, and furthermore, can be coded at a higher compression rate. For example, although the resolution of the first still image is increased, it is possible to reduce the file size after coding.

The image coding apparatus and method according to the present invention can decode a bit stream of the first still image coded at a high compression rate.

In addition, the image decoding apparatus and the image decoding method according to the present invention can assure full decoding in the image decoding apparatus.

The image processing apparatus according to the present invention can generate a natural completed image when a completed image is generated by removing a part of image from an image taken by a digital camera and the like, and filling the removed part with completed pixels, even when the removed part is to be completed with an image having a complex shape, or when the removed part is completed with an image which does not exist in the non-removed part.

Another image processing apparatus according to the present invention can change a low resolution image into a high resolution even when an example high resolution image is not obtained in advance.

Further Information about Technical Background to this Application

The disclosure of Japanese Patent Application No. 2007-008833, 2007-008834, 2007-008835 filed on Jan. 18, 2007 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 21 is a block diagram showing the configuration of the image processing apparatus;

DESCRIPTION OF THE PREFERRED EMBODIMENT(S)

First Embodiment

Figure 1:
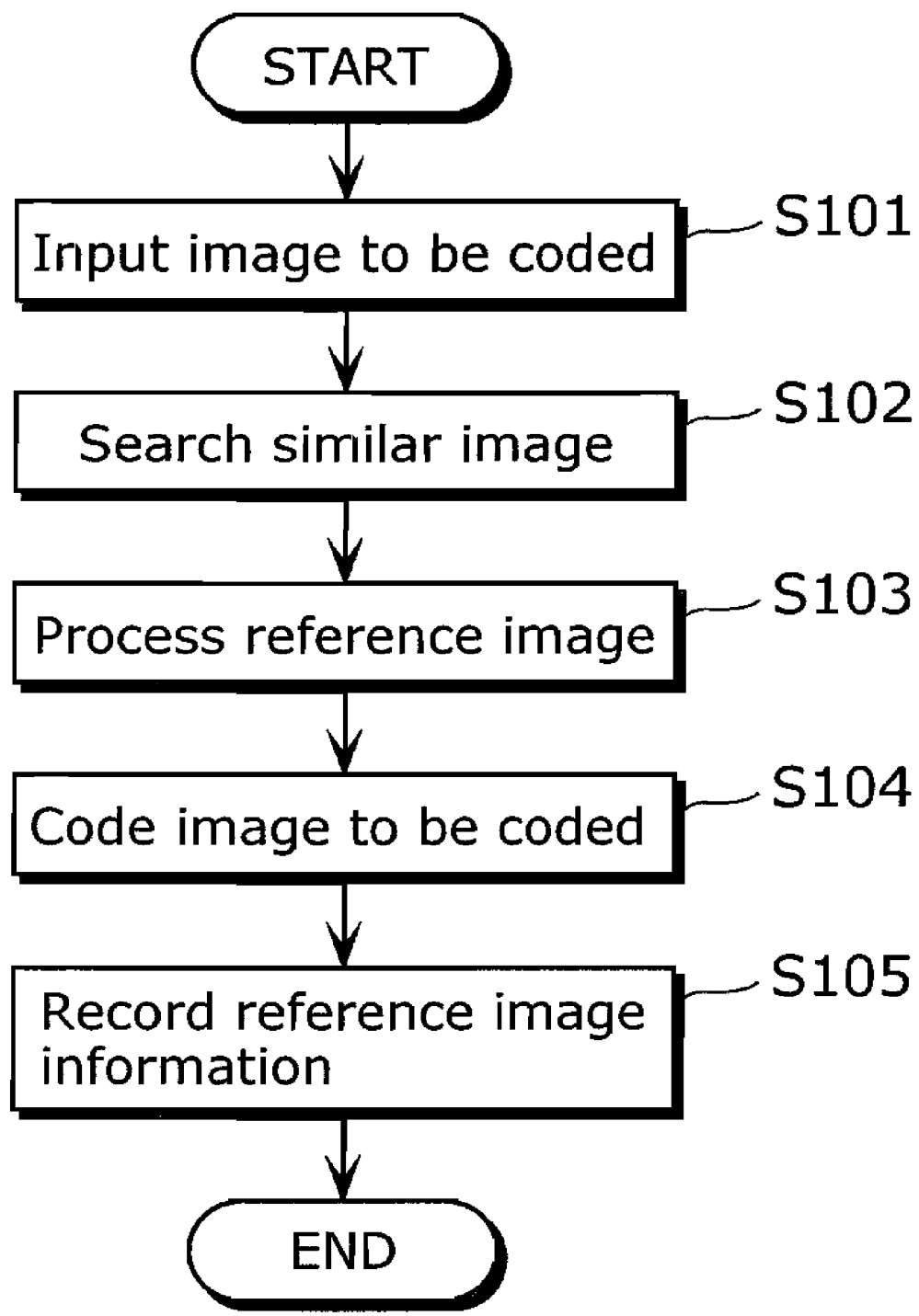
FIG. 1 is a flowchart for describing the image coding method in the first embodiment.
Figure 2:
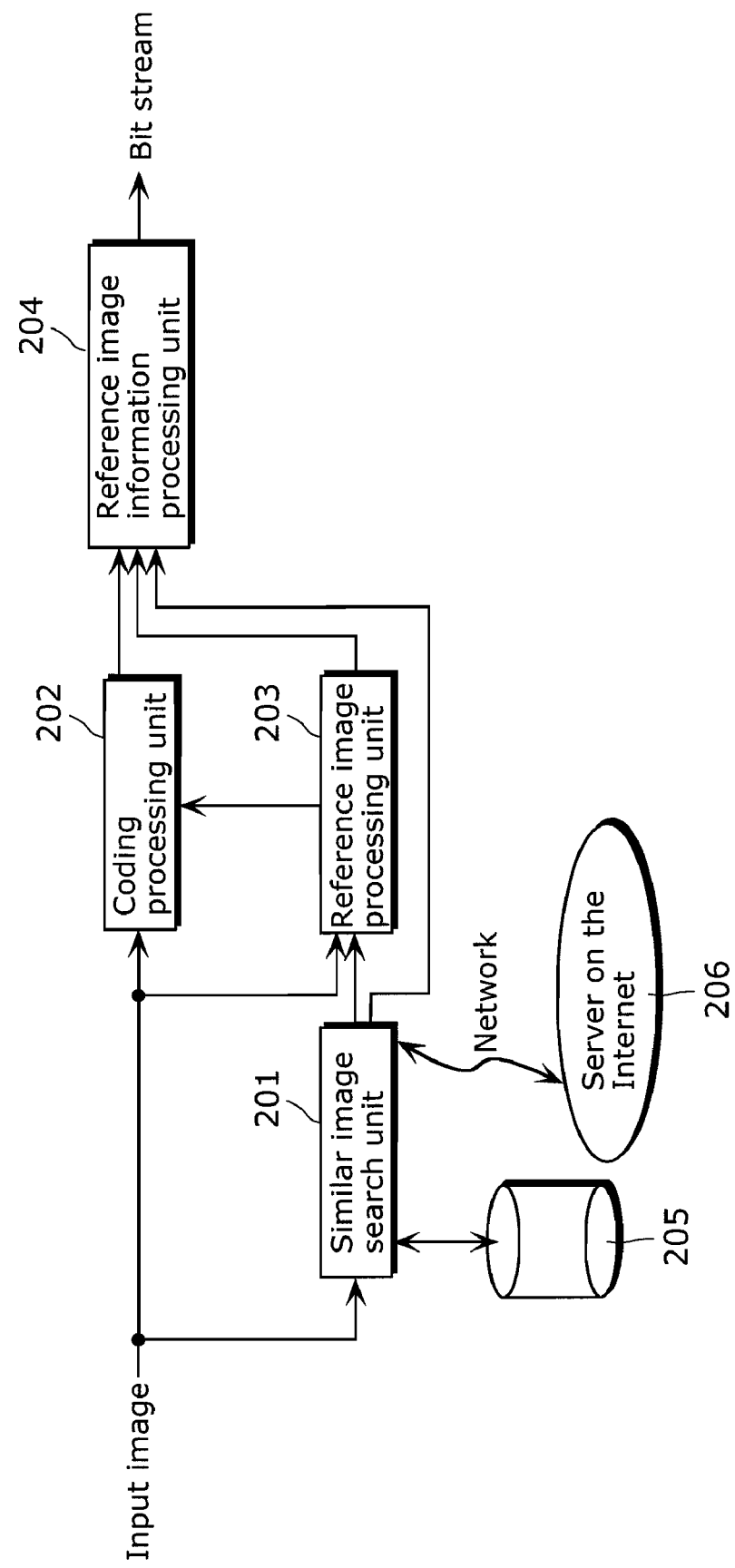
FIG. 2 is a block diagram showing the configuration of the image coding method in the first embodiment.

FIGS. 1 and 2 are a flowchart and a block diagram respectively showing an order of processing in the image processing method according to the present invention. As shown in FIG. 2, the image coding apparatus according to the present invention includes a similar image search unit 201, a coding processing unit 202, a reference image processing unit 203, a reference image information processing unit 204, and a storage medium 205.

As shown in FIG. 2, an image coding apparatus 200 includes the similar image search unit 201, the coding processing unit 202, the reference image processing unit 203, the reference image information processing unit 204, and the storage medium 205.

The similar image search unit 201 searches at least one of a second still image (hereinafter referred to as a similar image) which is similar to the first still image which is to be compressed and coded (hereinafter referred to as an input image) from a group of images. The group of images is still pictures stored in the storage medium 205 or still pictures stored in the server 206 on the Internet.

The coding processing unit 202 generates a predictive image for the input image using at least one similar image as the reference image, and generates a bit stream by coding the difference between the input image and the predictive image.

The reference image processing unit 203 operates as a transformation unit which performs a predetermined transformation processing for at least one similar image. In the predetermined transformation processing, at least one of the size or the imaging angle of the subject image included in the similar image is transformed to match the subject image included in the input picture. Although this transformation is not essential, the degree of similarity of the similar image is increased by the transformation.

The reference image information processing unit 204 adds information related to the source of the reference image, more specifically, the information which indicates the location of at least one of the similar image used as the reference image. In addition, the reference image information processing unit 204 adds the transformation information when the similar image is transformed, the transformation information indicates the transformation applied.

Figure 5A:
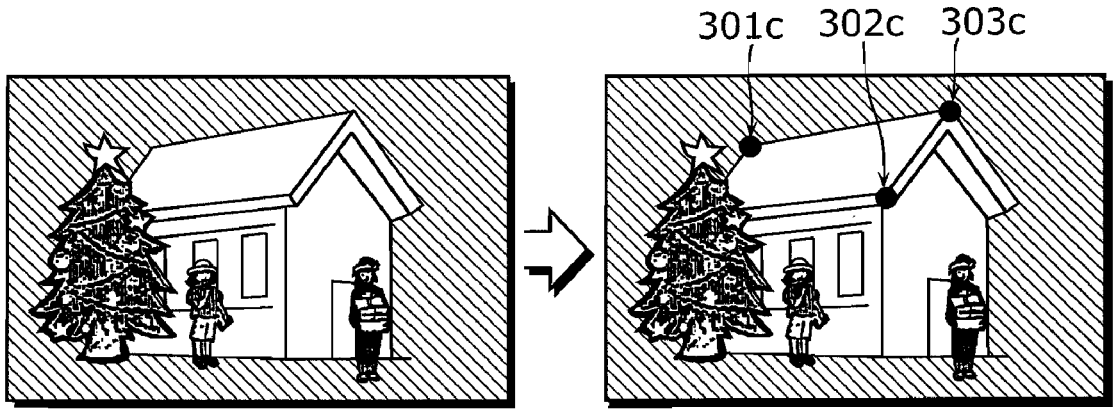
FIG. 5A is a pattern diagram for describing the image coding method.
Figure 5B:
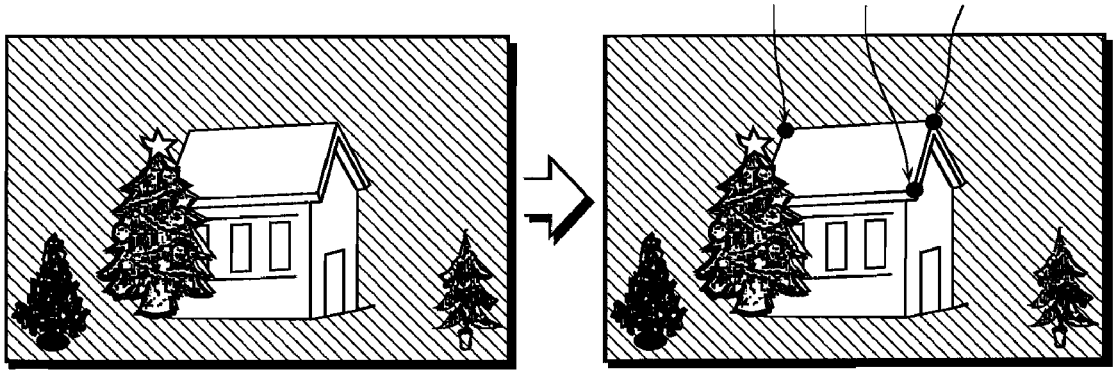
FIG. 5B is a pattern diagram for describing the image coding method.
Figure 5C:
FIG. 5C is a pattern diagram for describing the image coding method.

FIGS. 5A to 5C are pattern diagrams for describing the order of processing in the image coding method according to the present invention.

The input image (left of FIG. 5A) is inputted to the similar image search unit 201 (step S101).

In the similar image search unit 201, an image similar to the input picture is searched and obtained from the images recorded in the storage medium 205 inside the devices (cameras, personal computers, and video recorders and others) and images stored in the server 206 on the Internet (Step S102). When only images recorded in the devices are used, coding efficiency may be slightly lower despite the high search speed, while when images on the database or the Internet are used, the search takes longer although the coding efficiency may be higher in coding processing.

Various conventional methods can be used for the method to search similar images.

When searching the similar image, generally, feature quantity is extracted from an image and a distance scale (degree of similarity) is defined based on the feature quantity. An image which is closer in the distance scale with the input image is selected as the similar image from the images stored in the storage medium and the server and the like.

Here, when the input image is taken by a digital camera and when the keywords, the imaging location information obtained by the GPS and others, imaging date information and others are attached to the image as meta information, a search based on the keywords, the imaging location information and the imaging date information and others is performed, and then the images can be narrowed down with reference to the image feature quantity.

For example, when the location where the image was taken is known, an image similar to the input image can be extracted by using the name of the place as a keyword, using the location of the place as imaging location information, using the season or time as the imaging date information.

Here, the similar image obtained by the similar image search unit 201 may not be just one, however, following description is made assuming that one similar image (left on FIG. 5B) is obtained for the simplicity of description. In addition, the image obtained by the similar image search unit 201 is referred to as a reference image hereinafter.

Furthermore, the information regarding the source of the reference image is outputted to the reference image information processing unit 204. As information regarding the source of the reference image, file name and the like apply when the reference image is obtained in the device, and a URL, an IP address and the name of the file and others apply when the reference image is obtained on the Internet.

Figure 3:
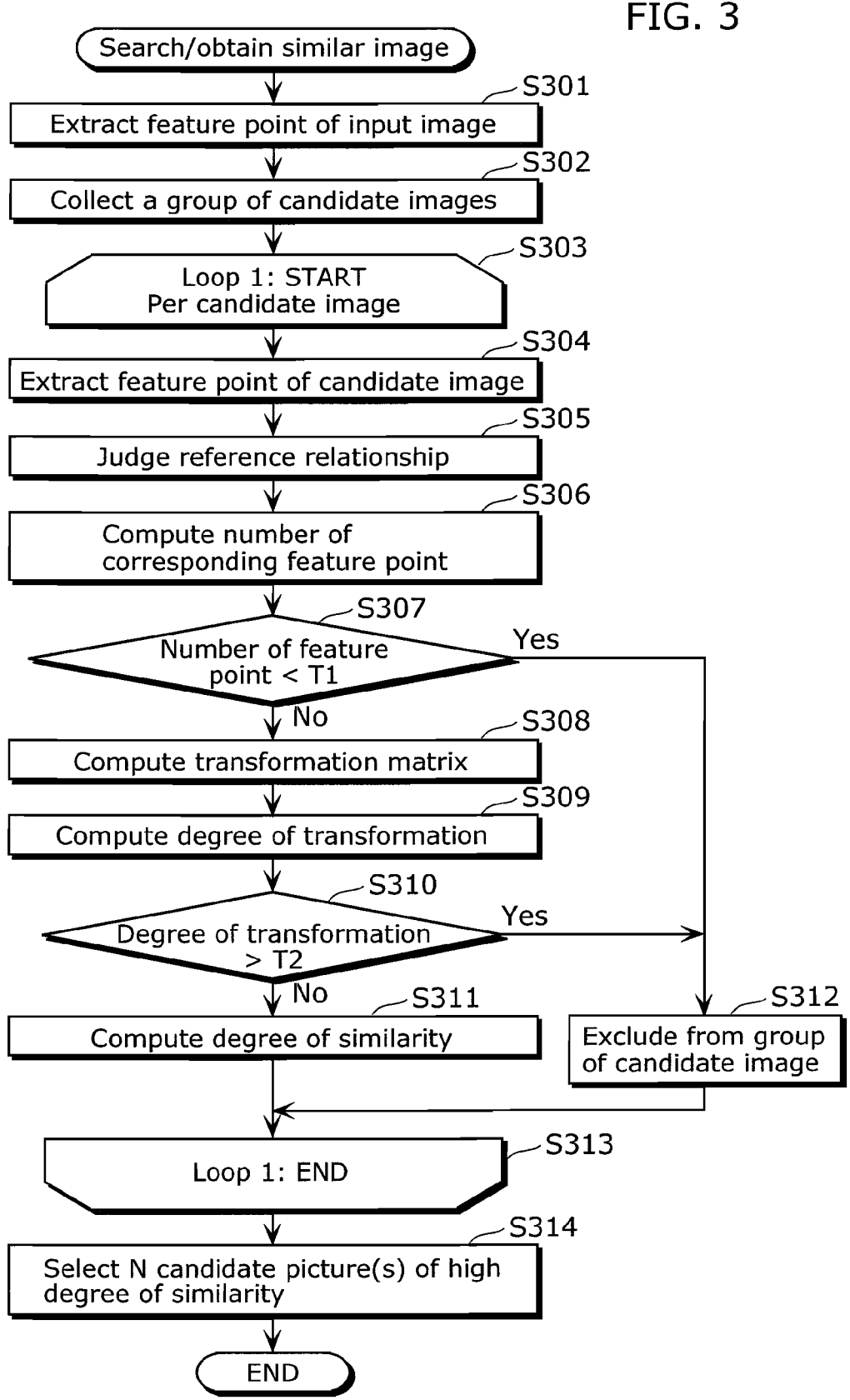
FIG. 3 is a flowchart showing a processing in the similar image search unit.

FIG. 3 is a flowchart showing a search processing in the similar image search unit 201. As shown in the flowchart, the similar image searching unit 201 extracts a feature point of the input image (S301). The number of the feature points is as many as the points correspond to the intersection points of edges and the corners. The Harris operator and Scale Invariant Feature Transform (SIFT) method can be used as a method for extracting the feature points.

Furthermore, the similar image search unit 201 collects a group of candidate images using the meta information from the still images stored in the storage medium 205 as a group of images, or still images on the Internet as a group of images (S302).

After the group of candidate images is collected, the similar image search unit 201 computes the degree of similarity for each of the candidate images in the loop 1 (S303 to S311). In the loop 1, the similar image search unit 201 extracts feature points indicating features of the candidate image (S304), judges pairs of feature points among the input image and the candidate image which correspond each other (S305), and computes the number of pairs (S306). On the right side of FIG. 5A, examples of feature points (301c, 302c, and 303c) in the candidate image are indicated. On the right side of FIG.

5B, examples of corresponding feature points in the candidate image (or the similar image) (301d, 302d, and 303d) are indicated. Here, a candidate image in which the number of pairs is less than the threshold value T1 is not determined to be a similar image and thus the candidate image is excluded from the group of candidate images (S307, S312).

Next, the similar image search unit 201 computes the transformation matrix for transforming the candidate image based on the judged pairs so that the size and the imaging angle of the candidate image are to be the same as those of the first still image (S308), and computes a degree of transformation which indicates the level of transformation of the candidate image based on the transformation matrix (S309). Here, the candidate image having a degree of transformation higher than the threshold value T2 is not determined to be a similar image, and thus the candidate image is excluded from a group of candidate images (S310, S312).

Furthermore, the similar image search unit 201 computes a degree of similarity which increases the more the number of pairs is, and the less the degree of transformation is (S311).

After the processing in loop 1, the similar image search unit 201 selects N candidate images as similar image in the order of the higher calculated degree of similarity (S314). Here, N may be at least 1.

The selected candidate image is inputted to the reference image processing unit 203 as the reference image obtained in the similar image search unit 201. Even if the reference image is an image taken in the same location as the input image, the images are rarely taken in the same angle or the same size. Thus, the reference image processing unit 203 transforms the reference image so that the reference image has the same angle and same size as those of the input image (step S103).

Here, the description is made under the assumption that the distance between the camera and the subject is significantly longer than the depth of the subject (for example, 10 times longer or more), and when the reference image is transformed by a projection transformation (the affine transformation) and the like. In this case, it is necessary to compute a (projection) transformation matrix between the input image and the reference image. Here, the correspondence relationship between the input image and the reference image is computed, and the transformation matrix is computed using the correspondence relationship. When computing the correspondence relationship between the input image and the reference image, a method, for example, for extracting feature points of both images using the Harris operator and the SIFT method to compute the correspondence relationship of the feature points In addition, when computing the transformation matrix from the correspondence relationship, using a method such as the least square method using the correspondence relationship of the inliers after outliers are detected with reference to the correspondence relationship and removed. Methods such as the RANdom Sample Consensus (RANSAC) may be used for detecting the outliers. The reference image processing unit 203 transforms the reference image into the transformed reference image (FIG. 5C) using the computed (projection) transformation matrix, and outputs the transformed reference image to the coding processing unit 202. Furthermore, the information on the transformation matrix is outputted to the reference image information processing unit 204.

Figure 4:
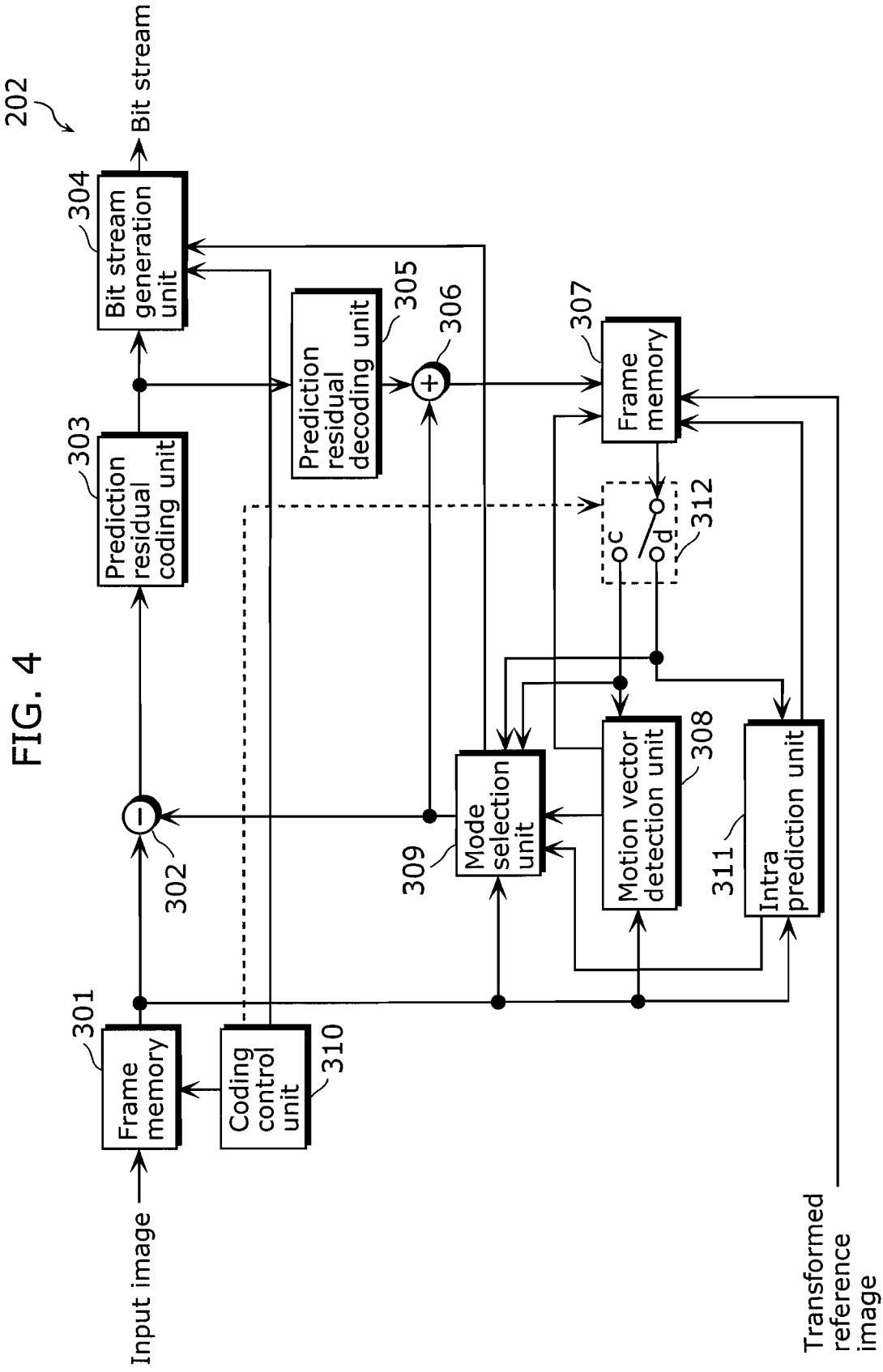
FIG. 4 is a block diagram for describing the image coding method.

The input image (FIG. 5A) and the transformed reference image (FIG. 5C) is inputted to the coding processing unit 202. FIG. 4 shows the configuration of the coding processing unit 202. As shown in FIG. 4, the coding processing unit 202 includes a frame memory 301, a difference computation unit 302, a prediction residual (difference) coding unit 303, a bit stream generation unit 304, a prediction residual decoding unit 305, an addition computation unit 306, a frame memory 307, a motion vector detection unit 308, a mode selection unit 309, a coding control unit 310, an intra picture coding unit 311 and a switch 312. The coding processing unit 202 is capable of performing the same function of the inter predictive coding processing as in the conventional moving image coding method such as the MPEG-2 and the H.264. Note that, however, the processing differs from the processing using the conventional moving image coding method in that the input image is not a moving image.

The input image is held in the frame memory 301. In addition, the transformed reference image is held in the frame memory 307. The input image which is once held in the frame memory 301 is read per unit such as macroblock. Here, it is assumed that the macroblock is horizontally 16 pixels×vertically 16 pixels.

Figure 6A:
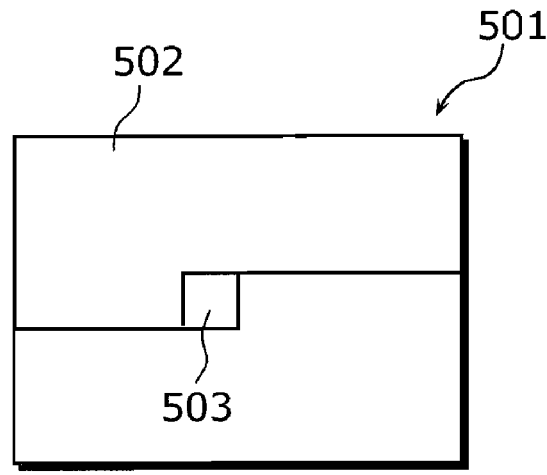
FIG. 6A is a pattern diagram for describing the image coding method.
Figure 6B:
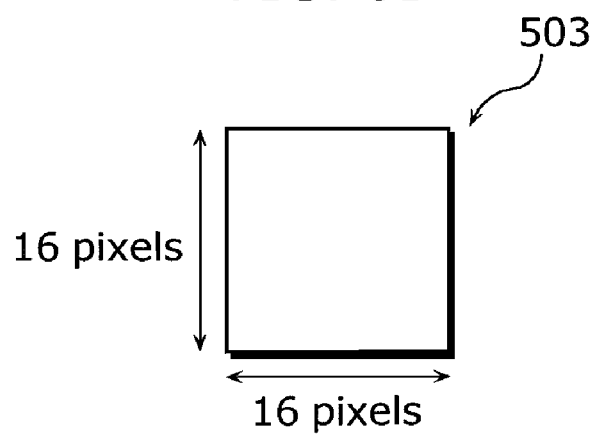
FIG. 6B is a pattern diagram for describing the image coding method.

Each of the macroblocks in the input image is processed in the so-called inter picture predictive coding. The coded reference image used in the inter picture predictive coding is the transformed reference image held in the frame memory 307. Here, a case where there is one coded reference image is described. The macroblock is coded in either the intra coding mode or the inter coding mode. In the intra coding mode, an intra prediction is performed, and in the inter coding mode, an inter prediction (motion compensation prediction) is performed. In the coding processing unit 202, when coding the macroblocks, a temporary coding including an intra prediction and a motion compensation prediction is performed, and determines which coding mode is the most efficient in coding. Coding is performed in the coding mode which is determined to be the most efficient in coding. The coding mode is determined in the mode selection unit 309. The order of coding which includes determining the coding mode is described hereafter. The description is made with reference to FIG. 6A, assuming that 501 represents the input image, and the coding has been completed in the area represented as 502, and 503 represents the current macroblock to be coded.

The coding control unit 310 first connects the switch 312 to d. The pixels which are read out from the frame memory 301 are inputted to the intra prediction unit 311.

Figure 6C:
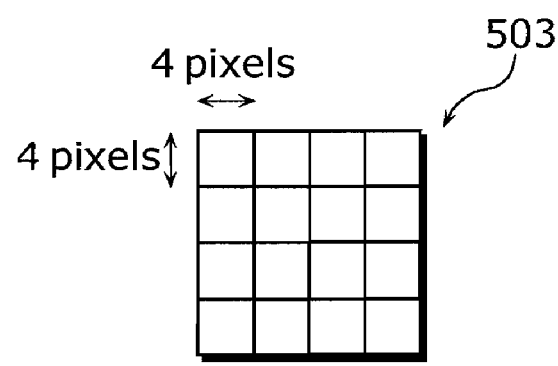
FIG. 6C is a pattern diagram for describing the image coding method.
Figure 7A:
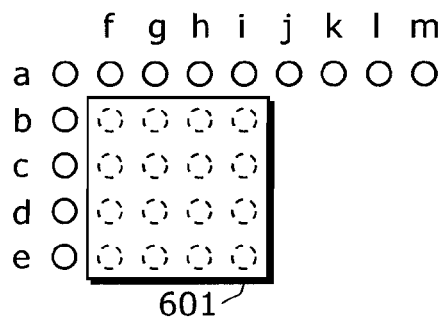
FIG. 7A is a pattern diagram for describing the image coding method.
Figure 7B:
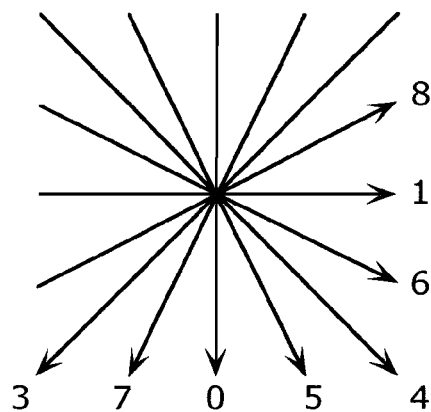
FIG. 7B is a pattern diagram for describing the image coding method.
Figure 7C:
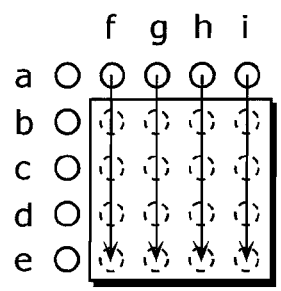
FIG. 7C is a pattern diagram for describing the image coding method.
Figure 7D:
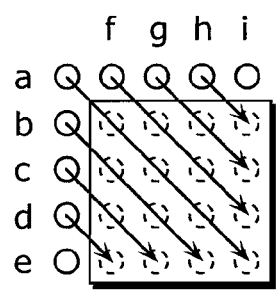
FIG. 7D is a pattern diagram for describing the image coding method.

The intra prediction unit 311 generates an intra prediction block using the intra prediction method. In the intra prediction unit 311, an intra prediction image is generated per a small block of 4×4 pixels included in the macroblock 503 shown in FIG. 6C. The method is described with reference to FIGS. 7A to 7D. FIG. 7A is a pattern diagram showing positional relationship between the pixels in a block to be processed 601 (white circles in broken lines) and pixels to be used when generating an intra prediction image (white circles in solid lines). The intra prediction image is generated using the pixels in solid-line white circles in the directions shown in FIG. 7B. Here, the reference numerals in FIG. 7B indicates the intra prediction methods, and the prediction method 2 is not shown in the diagram since the average pixel value of the neighboring pixels a to is used for the intra prediction image. Thus, there are 9 intra prediction methods in total. For example, in the intra prediction method 0, as shown in FIG. 7C, the pixel value of the pixel f is determined to be the intra prediction value for the four pixels on the leftmost column in the current block 601. In the same manner, the pixels g to i are respectively determined to be the intra prediction value for 4 pixels in each column. In addition, the pixel used when generating the intra prediction image (white circles in solid lines in FIG. 7A), coding has been completed and pixels are stored in the frame memory 307.

An intra prediction method is selected for each small block out of nine methods, the method can be determined in various ways. For example, an intra prediction method with which an evaluation value computed based on a predetermined evaluation standard is to be the maximum or the minimum can be selected. For example, an addition of absolute values or an addition of square values of the pixel values of the corresponding pixel between the small block and the intra prediction image can be used as the evaluation standard. In this case, an intra image prediction method in which the evaluation value is to be the minimum is selected. The intra prediction unit 311 outputs, per each small block, a number N which indicates an intra prediction block and an intra prediction method to the mode selection unit 309.

Subsequently, the coding control unit 310 is connected to the switch 312. The pixels in the macroblock to be processed, which are read out from the frame memory 301 are inputted to the motion vector detection unit 308.

Figure 8A:
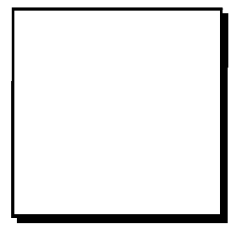
FIG. 8A is a pattern diagram for describing the image coding method.
Figure 8B:
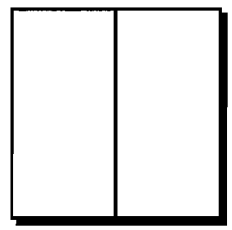
FIG. 8B is a pattern diagram for describing the image coding method.
Figure 8C:
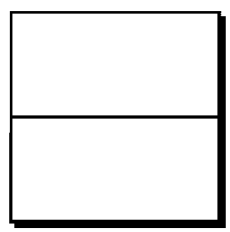
FIG. 8C is a pattern diagram for describing the image coding method.
Figure 8D:
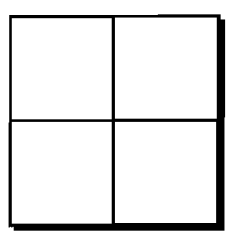
FIG. 8D is a pattern diagram for describing the image coding method.

In the motion vector detection unit 308, the transformed reference image stored in the frame memory 307 is used as a reference image, and motion vector detection is performed for each block in the macroblock. When detecting motion vectors, a macroblock can be divided into blocks with various shapes. FIG. 8A to 8D indicates the examples. FIG. 8A represents the case where the macroblock is not divided, FIG. 8B represents the case where the macroblock is divided into two macroblocks with horizontally 8 pixels and vertically 16 pixels, FIG. 8C represents the case where the macroblock is divided into two macroblocks with horizontally 16 pixels and vertically 8 pixels, and FIG. 8D represents the case where the macroblock is divided into four blocks with horizontally 8 pixels and vertically 8 pixels. When dividing the macroblock into multiple blocks, different motion vectors can be detected on each block. In addition, when detecting a motion vector in each block (macroblock), the motion vector can be determined in various methods. For example, a motion vector with which an evaluation value computed based on a predetermined evaluation standard is to be the maximum or the minimum can be selected. For example, an addition of absolute values or addition of square values of corresponding pixel in the current block to be processed and the reference picture can be used as an evaluation standard. In this case, a motion vector with which the evaluation value is to be the minimum is selected. The motion vector detection unit 308 outputs a motion vector, per dividing method of macroblock, to the mode selection unit 309.

The mode selection unit 309 determines a coding mode for a macroblock using the intra prediction method obtained in the intra prediction unit 311 and the motion vector detected in the motion vector detection unit 308. When determining the coding mode, various methods can be used, however, a method with which the coding error is smaller in smaller bit amount is selected. Preliminary coding may be performed in the intra coding mode and the inter coding mode in the mode selection unit 309 for determining the coding mode. Alternatively, the coding mode may be determined using the amount of code and the error between the input image and the local decoded image or using the error between the intra prediction image and the motion compensated image. In addition, in the inter coding mode, a method for dividing the macroblock is determined with an assumption that in which method for dividing the macroblocks the coding efficiency will be the highest.

The coding mode determined in the mode selection unit 309 and the information attached to the coding mode (the intra prediction method in the case of intra coding mode, the macroblock dividing method and motion vectors in the case of inter prediction method) is outputted to the bit stream generation unit 304. In addition, the image in accordance with the determined coding mode (an intra prediction image in the case of the intra coding mode, and a motion compensated image obtained from the transformed reference image in the case of inter coding mode) is outputted to the difference operation unit 302 and the addition operation unit 306.

The difference operation unit 302 operates the difference between the image data of the macroblock to be processed and the image outputted from the mode selection unit 309 and generates and outputs a predicted error image.

The predicted error image is inputted to the prediction residual coding unit 303. The prediction residual coding unit 303 generates and outputs coded data by coding the predicted error image such as frequency transformation and quantization. Here, frequency transformation and quantization can be performed, for example, per unit with horizontally 4 pixels× vertically 4 pixels. The coded data outputted from the prediction residual coding unit 303 is inputted to the bit stream generation unit 304 and the prediction residual decoding unit 305.

The bit stream generation unit 304 generates a bit stream by performing variable length coding and others and by adding information inputted from the mode selection unit 309 such as the information on the coded mode, on the intra prediction method, on the motion vector, and on other headers and the like to the inputted coded data.

The prediction residual decoding unit 305 performs decoding such as inverse quantization and inverse frequency transformation and the like, and generates and outputs a decoded difference image. The decoded difference image is to be the local decoded image after addition with the predictive image, and is stored in the frame memory 307. The local decoded image is used for the intra prediction when coding subsequent macroblocks.

Coding is performed on all the rest of macroblocks in the input image by continuing the processing. The image bit stream generated in the coding processing unit 202 the reference image is outputted to the reference image information processing unit 204.

Figure 9A:
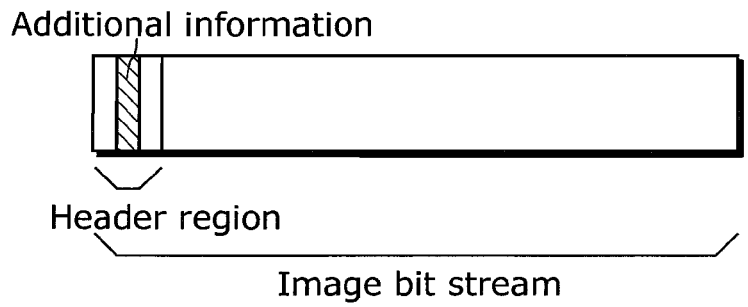
FIG. 9A is a pattern diagram for describing a bit stream generated in the image coding method.
Figure 9B:
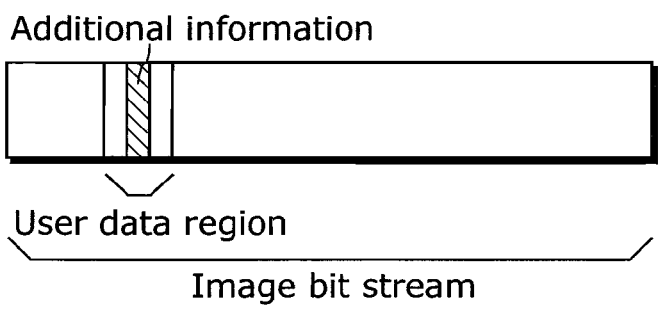
FIG. 9B is a pattern diagram for describing a bit stream generated in the image coding method.
Figure 9C:
FIG. 9C is a pattern diagram for describing a bit stream generated in the image coding method.

The information regarding the source of reference image outputted from the similar image search unit 201 and the image bit stream outputted from the coding processing unit 202 and information on the transformation matrix outputted from the reference image processing unit 203 is inputted to the reference image information processing unit 204. The reference image information processing unit 204 processes the information regarding the source of the reference image, and the information on the transformation matrix as the additional information to the image bit stream. When processing the information regarding the source of the reference image and the information on the transformation matrix as additional information, there is a method in which the information is described on the header region or the user data region in the image bit stream (FIG. 9A, FIG. 9B), or there is another method in which the information is stored, transmitted and received as data which is different from the image bit stream (FIG. 9C). When handling the data as data different from the image bit stream, for example, in the case where the data is recorded on the recording medium, the image bit stream may be recorded on the content recording region and the additional information may be recorded on the recording region for content management information and attribute information. In addition, for example, when the image bit stream is transmitted and received via the network, the image bit stream may be transmitted and received using a protocol or an ID different from those of the additional information.

As described above, in the image coding method according to the present invention, when coding a still image or when coding an image conventionally coded in a moving picture using the intra coding, a similar image with respect to the image to be coded are searched and obtained from the images stored in the device, database, a server on the Internet and others. Furthermore, an image bit stream is generated by using the similar image as a reference image and performing an inter predictive coding. In addition, the information on the similar image used for coding (the name of file and URL) is added to the image bit stream as the additional information.

Therefore, with the image coding method according to the present invention, when coding a still image or when coding an image conventionally coded in a moving picture using the intra coding, it is possible to dramatically increase the efficiency in coding (increase the compression rate) than the conventional methods.

Note that, in the present embodiment, the description is made that the transformation matrix of the reference image is computed in the reference image processing unit 203 (step S103), the transformation matrix may be computed in the similar image search unit 201 (step S102). In this case, when selecting a similar image from the stored images in the similar image search unit 201 (step S102), the transformation matrix from the input image to the stored image is computed, and the transformation matrix is set to be a basis for selecting the similar image. The transformation matrix corresponding to the selected similar image is outputted to the reference image processing unit 203. In this case, in the reference image processing unit 203 (step S103), it is not necessary to calculate the transformation matrix. In addition, in the similar image search unit 201 (step S102), feature points are extracted by the Harris operator and the SIFT method, and a similar image may be obtained based on the correspondence relationship of the feature points. In the reference image processing unit 203 (step S103), a transformation matrix may be computed from the correspondence of feature points extracted in the similar image search unit 201 (step S102).

In addition, in the present embodiment, the description is made for the case where a similar image with respect to the input image is searched in the similar image search unit 201 (step S102) from the stored images based on the similarity and the keyword and the like, however, the similar image may be selected by an explicit designation of the user from the stored images. In this case, the search using the similarity, keywords and others, and the explicit selection of the user can be combined. For example, similar images can be narrowed down to a few by a search using the degree of similarity, keywords and others, and the user designates an image which the user prefers to use for coding the input image. In such a method, despite the slight increase on the user's workload, the efficiency in coding is likely to improve further.

Figure 9D:
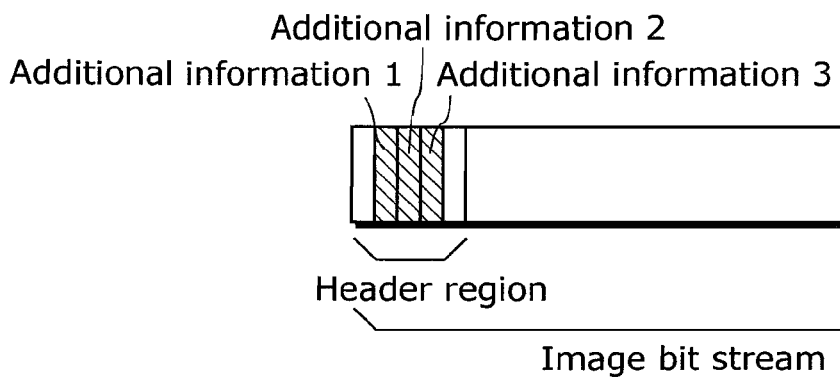
FIG. 9D is a pattern diagram for describing a bit stream generated in the image coding method.

In addition, in the present embodiment, the description is made for the case where only one reference image is selected in the similar image search unit 201 (step S102), however, multiple reference images may be selected. When multiple reference images are selected, the reference images may be held in the frame memory 307 in the coding processing unit 202, and coding may be performed using the multi-picture prediction method used in the H.264. In addition, in the reference image information processing unit 204, the information on the source of the reference images and the information on the transformation matrix with respect to the images used as reference images are processed as additional information. FIG. 9D shows an example in which the additional information is described as header information in the image bit stream. In addition, even if the reference image is held in the frame memory 307, when there is a reference image which is not used as a reference picture in coding, it is not necessary to record or transmit the information regarding the source of the reference image and the information on transformation matrix as additional information.

In addition, in the present embodiment, the description is made that the reference image is transformed to a transformed reference image using the transformation matrix in the reference image processing unit 203 (step S103), it is not necessary to perform the transformation. This may be applied, for example, to the case where the reference image is an image which is already similar to the input image. This renders the generation of information regarding the transformation matrix for the reference image in the reference image information processing unit 204 (step S105) unnecessary, and it is possible to slightly decrease the code amount.

Figure 13B:
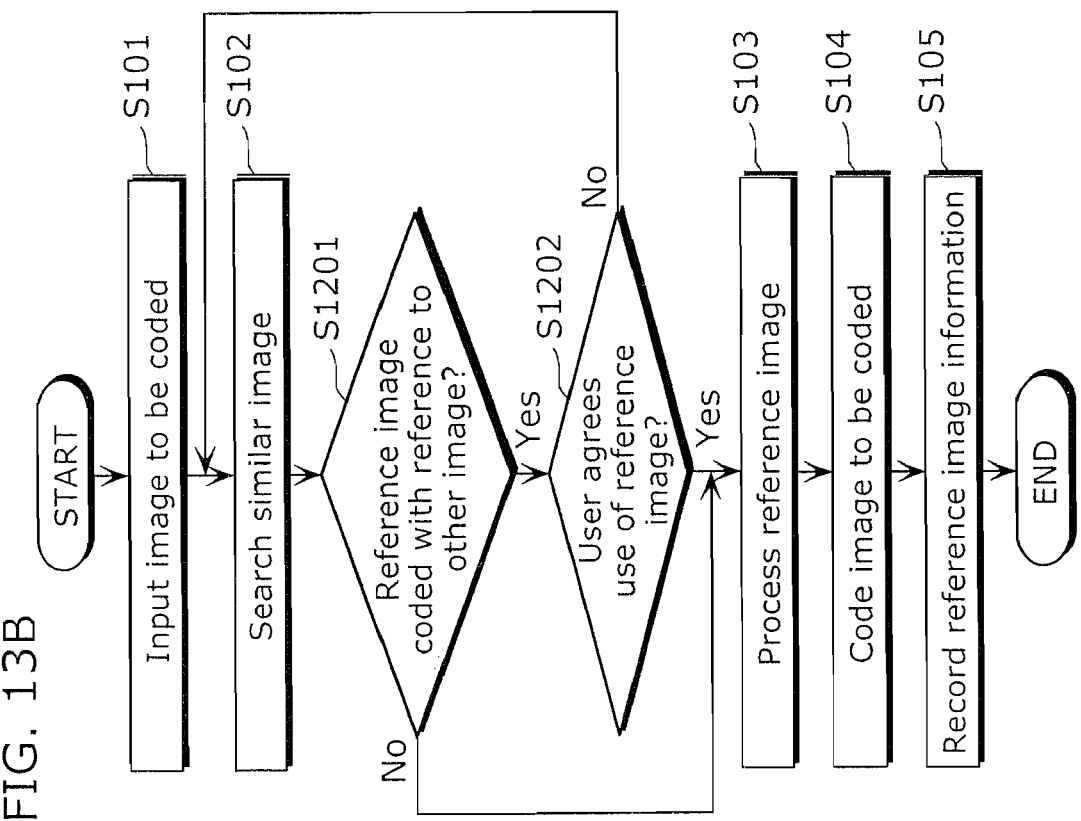
FIG. 13B is a flowchart for describing the image coding method.
Figure 13A:
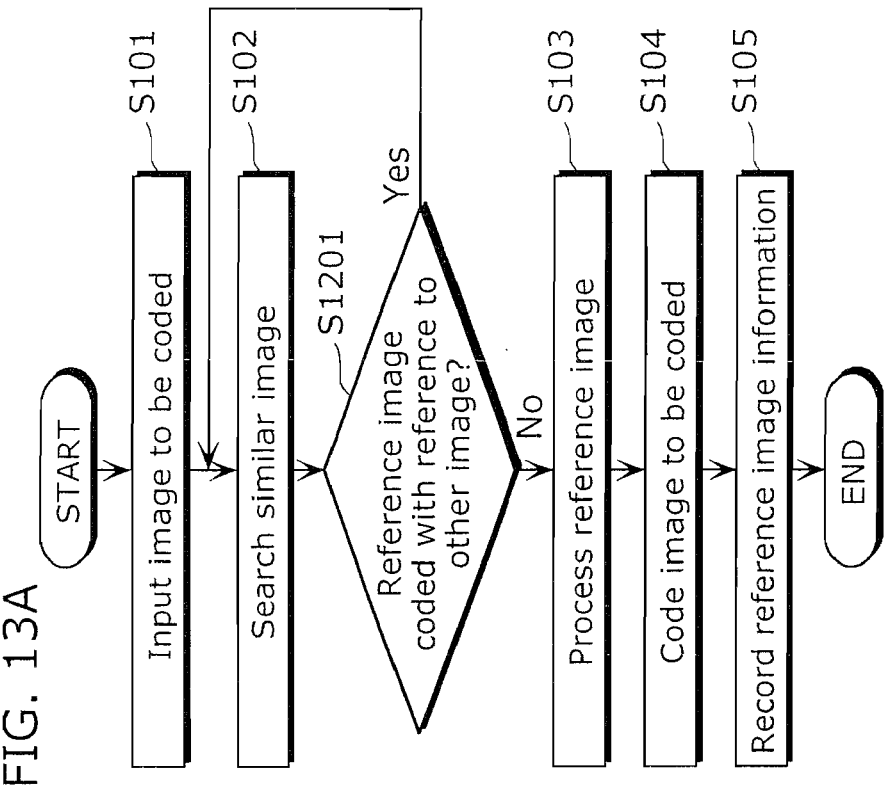
FIG. 13A is a flowchart for describing the image coding method.

In addition, in the present embodiment, the process has been described with reference to FIG. 1, however, the order of processing shown in the flowchart in FIG. 13A may also be used. In FIG. 13A, step S1201 is added to the order of processing shown in FIG. 1. In step S1201, after a similar image for the input image is searched in step S102 and the reference image is obtained, it is determined whether or not the image is coded with reference to another image in the image coding method according to the present invention and others. When the reference image is an image coded with reference to another image (Yes in step S1201), the processing returns to step S102 and another similar image is searched again. When reference image does not refer to other images (No in step S1201), processing after step S103 is performed to code the input image. Such a processing prevents the images from being referred to in a concatenated manner. In addition, when the reference image is coded with reference to other images, the image referred to by the reference image has to be obtained in order to perform coding, resulting in complex processing. The processing shown in FIG. 13A prevents this from occurring. In addition, even when the reference image is an image coded with reference to another image (Yes in step S1201), the reference image may be used if the user agrees the use of the reference image for coding the input image. FIG. 13B shows the order of processing in such a case. In FIG. 13B, step S1202 (judges whether the user agrees the use of the reference image for coding the input image or not) is added to the order of processing shown in FIG. 13A.

Note that the description has been made that the coding processing unit 202 has a configuration capable of process the moving picture coding method such as the H.264 and the MPEG-2, the coding processing unit 202 may take any configuration which is capable of generating the predictive image for the input image using the similar image as the reference image, and coding the difference between the similar image and the predictive image.

For example, the difference between the similar image and the input image may be compressed by the JPEG or the JPEG 2000. In addition, the coding processing unit 202 may not include the intra prediction unit 311 which performs an intra prediction coding in the moving picture coding method such as the H.264 and the MPEG-2. In addition, the coding processing unit 202 may not include the prediction residual coding unit 303 performs orthogonal transformation and quantization.

In addition, the degree of similarity may be an approximate degree of similarity since the image coding apparatus according to the present invention can obtain a compression rate higher than the conventional technology even if the degree of similarity is low. For example, in the case where the input image is taken on one person, the similar image may be an image of another person, or an image which is similar only in the background color, or an image which is similar in brightness, color, or tone. In this sense, the processing in S307, S309, and S312 in FIG. 3 are not necessary. Alternatively, the threshold values T1 and T2 may be a small number and a large value, respectively.

Processing in S302 to S314 of FIG. 3 may be performed twice. In such a case, only a search on the storage medium 205 is performed in the first S302, and a search on the internet is performed on the second S302. The threshold values T1 and T2 may be changed for the first processing and the second processing. The second processing may be skipped when a candidate with a high degree of similarity is found in the first processing.

The reference image information processing unit 204 may copy a reference image file to the storage medium 205 when the reference image is a similar image found on the Internet.

Second Embodiment

Figure 10:
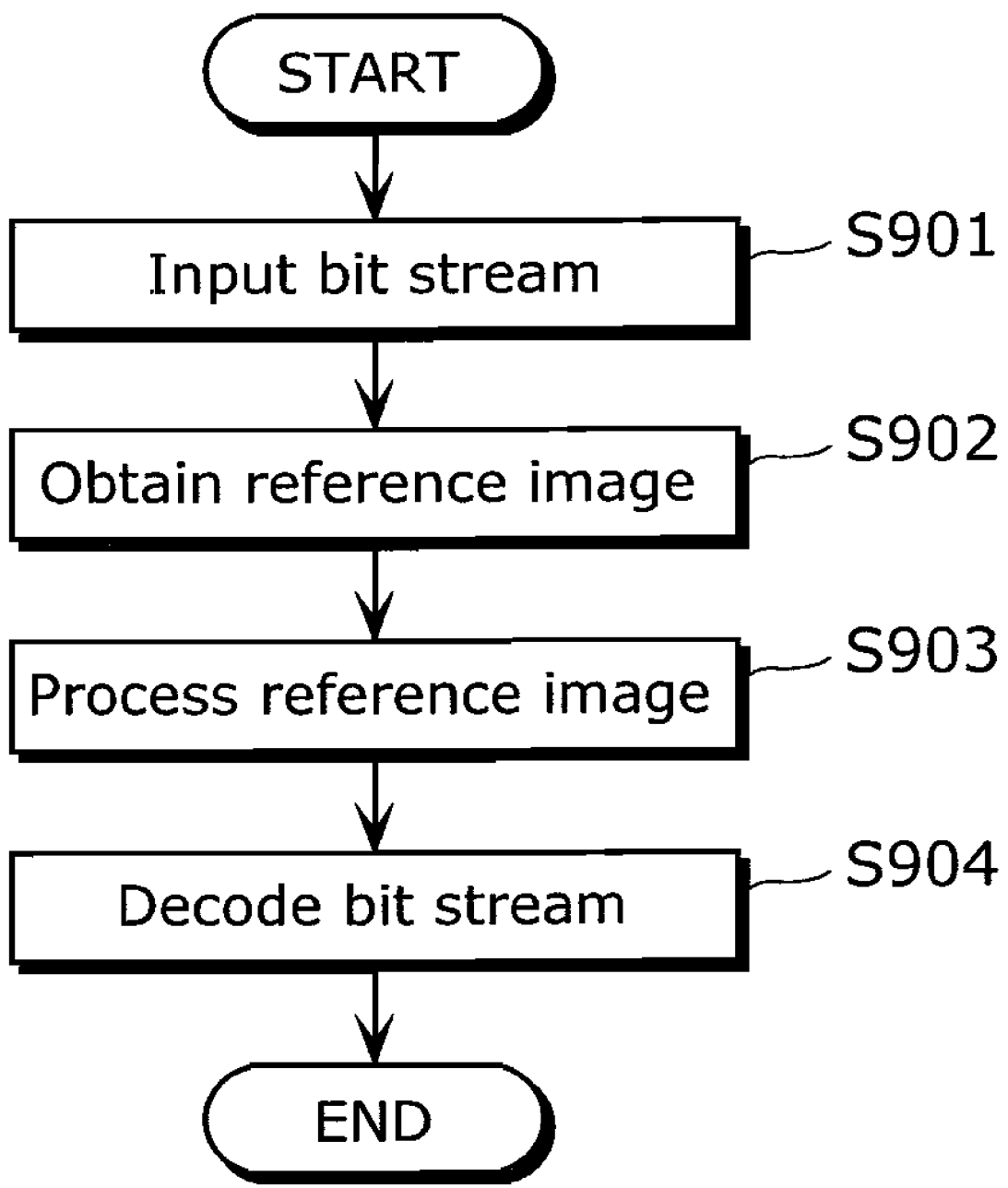
FIG. 10 is a flowchart for describing the image coding method in the second embodiment.
Figure 11:
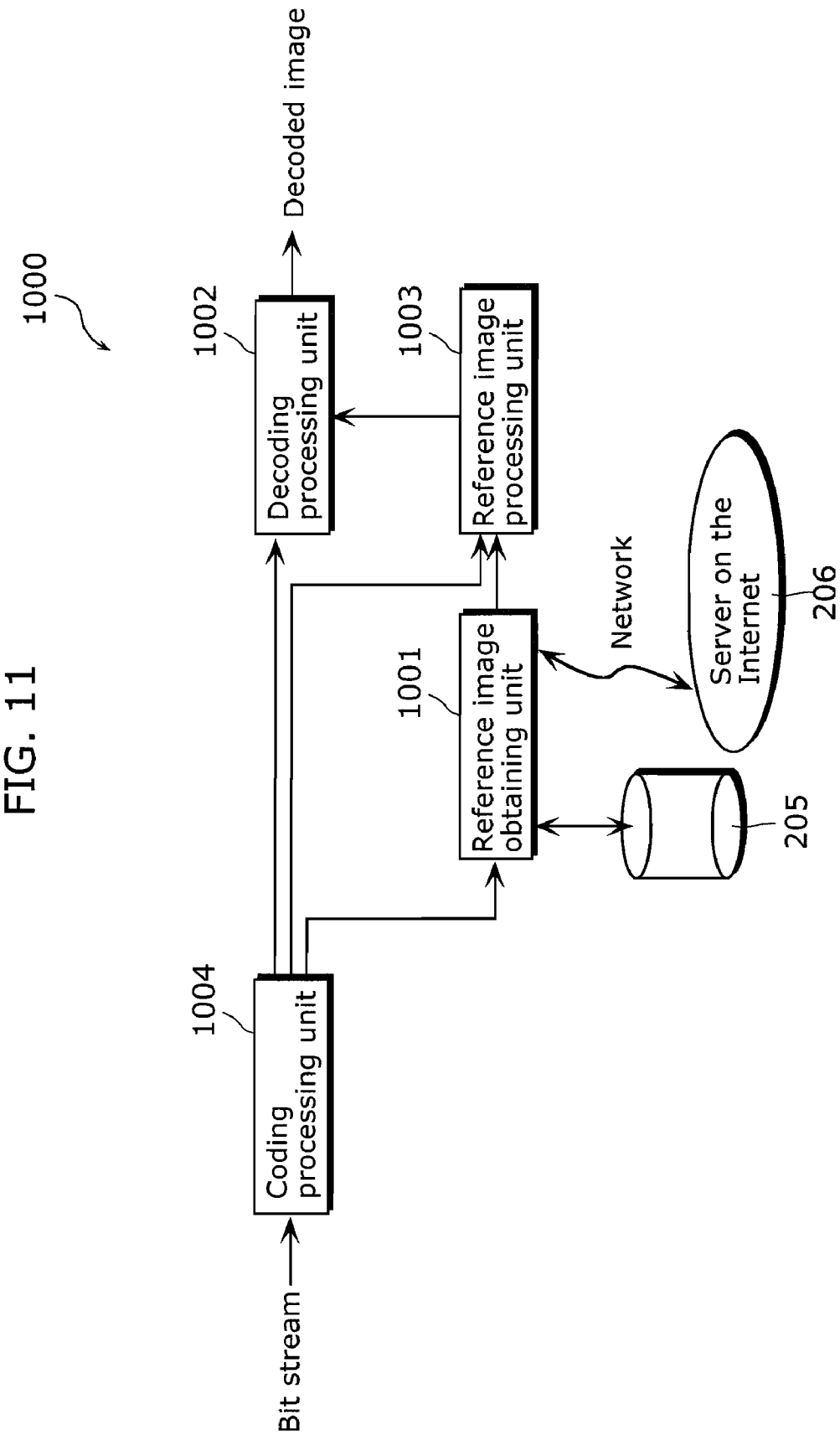
FIG. 11 is a block diagram for describing the image decoding method.

FIGS. 10 and 11 are respectively a flowchart and a block diagram showing an order of processing of the image decoding method according to the present invention. As shown in FIG. 11, the image coding apparatus according to the present invention includes a reference image obtainment unit 1001, a decoding processing unit 1002, a reference image processing unit 1003, and a bit stream processing unit 1004.

The input bit stream is a bit stream generated in the image coding method according to the present invention, and the configurations are shown in FIG. 9. The bit stream is inputted to the bit stream processing unit 1004 (Step S901). The bit stream processing unit 1004 divides the bit stream into the image bit stream and the additional information bit stream. The image bit stream is outputted to the decoding processing unit 1002 and the information on the source of the reference image in the additional information bit stream is outputted to the reference image obtainment unit 1001. In addition, the information on the transformation matrix in the additional information bit stream is outputted to the reference image processing unit 1003.

The reference image obtainment unit 1001 obtains a reference image (FIG. 5B) based on the information regarding the source of the reference image obtained by the bit stream processing unit 1004 (a file name and a URL and the like) (step S902). The obtained reference image is outputted to the reference image processing unit 1003.

The reference image processing unit 1003 transforms the reference image obtained from the bit stream processing unit 1004 into a transformed reference image (FIG. 5C), and outputs the transformed reference image to the decoding processing unit 1002.

Figure 12:
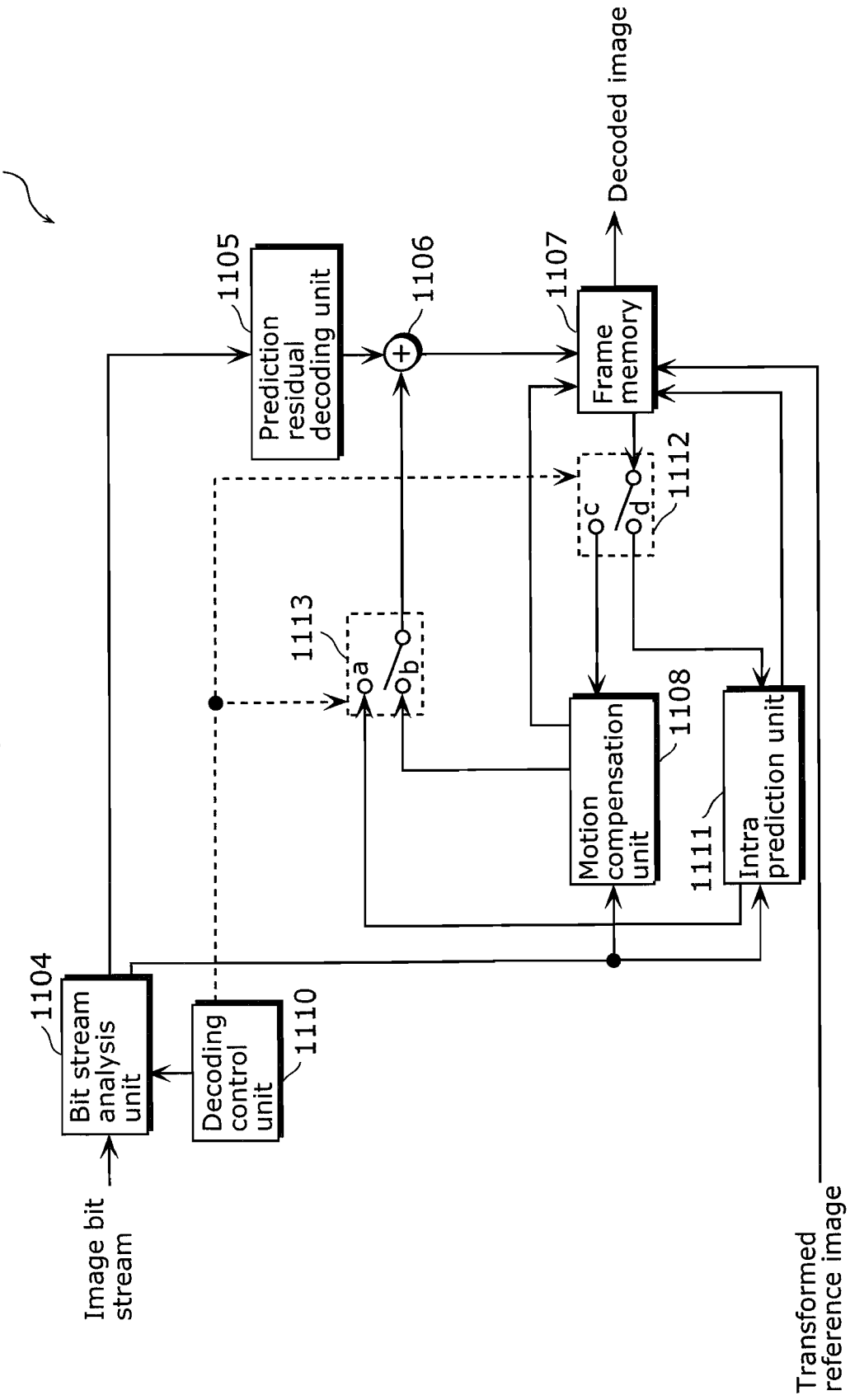
FIG. 12 is a block diagram for describing the image decoding method.

The image bit stream and the transformed reference image are inputted to the decoding processing unit 1002. FIG. 12 shows the configuration of the decoding processing unit 1002. As shown in FIG. 12, the decoding processing unit 1002 includes a prediction residual decoding unit 1105, an addition operation unit 1106, a frame memory 1107, a motion compensation unit 1108, a decoding control unit 1110, an intra prediction unit 1111, switches 1112 and 1113. The decoding processing unit 1002 includes functions for performing the inter predictive decoding in the conventional moving picture decoding method such as the MPEG-2 and the H.264 and the like. However, the processing is different from the processing in the conventional moving picture decoding method in that the input image is not an image bit stream of the moving picture.

The image bit stream is inputted to the bit stream analysis unit 1104. The bit stream analysis unit 1104 outputs, from the image bit stream, the prediction residual data to the prediction residual decoding unit 1105, the coded mode information to the decoding control unit 1110, the intra prediction information to the intra prediction unit 111, and the motion vector information to the motion compensation unit 1108, respectively.

The transformed reference image is held in the frame memory 307.

The decoding control unit 1110 connects the switch 1112 to d and the switch 1113 to a when, the coding mode of a macroblock to be decoded is the intra coding mode. The intra prediction unit 1111 obtains the pixel value of the pixels around the block to be decoded (already decoded and stored in the frame memory 1107) from the frame memory 1107, and generates an intra predictive image. The intra predictive image is outputted to the addition operation unit 1106 via the switch 1113.

The decoding control unit 1110 connects the switch 1112 to c and the switch 1113 to b when the coding mode of the macroblock to be decoded is the inter coding mode. The motion compensation unit 1108 obtains a pixel value of the transformed reference image held in the frame memory 1107 based on the motion vector information obtained from the bit stream analysis unit 1104 and generates a motion compensated image. The motion compensated image is outputted to the addition operation unit 1106 via the switch 1113.

The prediction residual decoding unit 1105 generates and outputs a decoded difference image by performing decoding such as an inverse quantization and an inverse frequency conversion. The decoded difference image becomes a decoded image after an addition with the predictive image (the intra predictive image or a motion-compensated image) in the addition operation unit 1106, and is stored in the frame memory 1107. The decoded image is used for intra prediction when coding subsequent macroblocks.

Decoding is performed on all the rest of macroblocks in the input image by continuing the same processing. The decoded image generated in the decoding processing unit 1002 is outputted as an image decoded in the image decoding method 1000.

As described above, the image decoding method according to the present invention obtains a similar image for the image to be decoded from the images stored in devices, a database, a server on the Internet and the like when decoding a still image or an image conventionally coded using the intra coding in the moving picture. The inter prediction decoding is performed using the similar image as the reference image to generate the decoded image.

Thus, with the image decoding method according to the present invention, a coded image which is coded at a high compression rate in the image coding method according to the present invention can be properly decoded to a decoded image.

Note that, in the present embodiment, the description is made that the reference image is transformed to a transformed reference image using the transformation matrix in the reference image processing unit 1003 (step S903), it is not necessary to perform the transformation when the information regarding the transformation matrix is not included in the bit stream.

Figure 14:
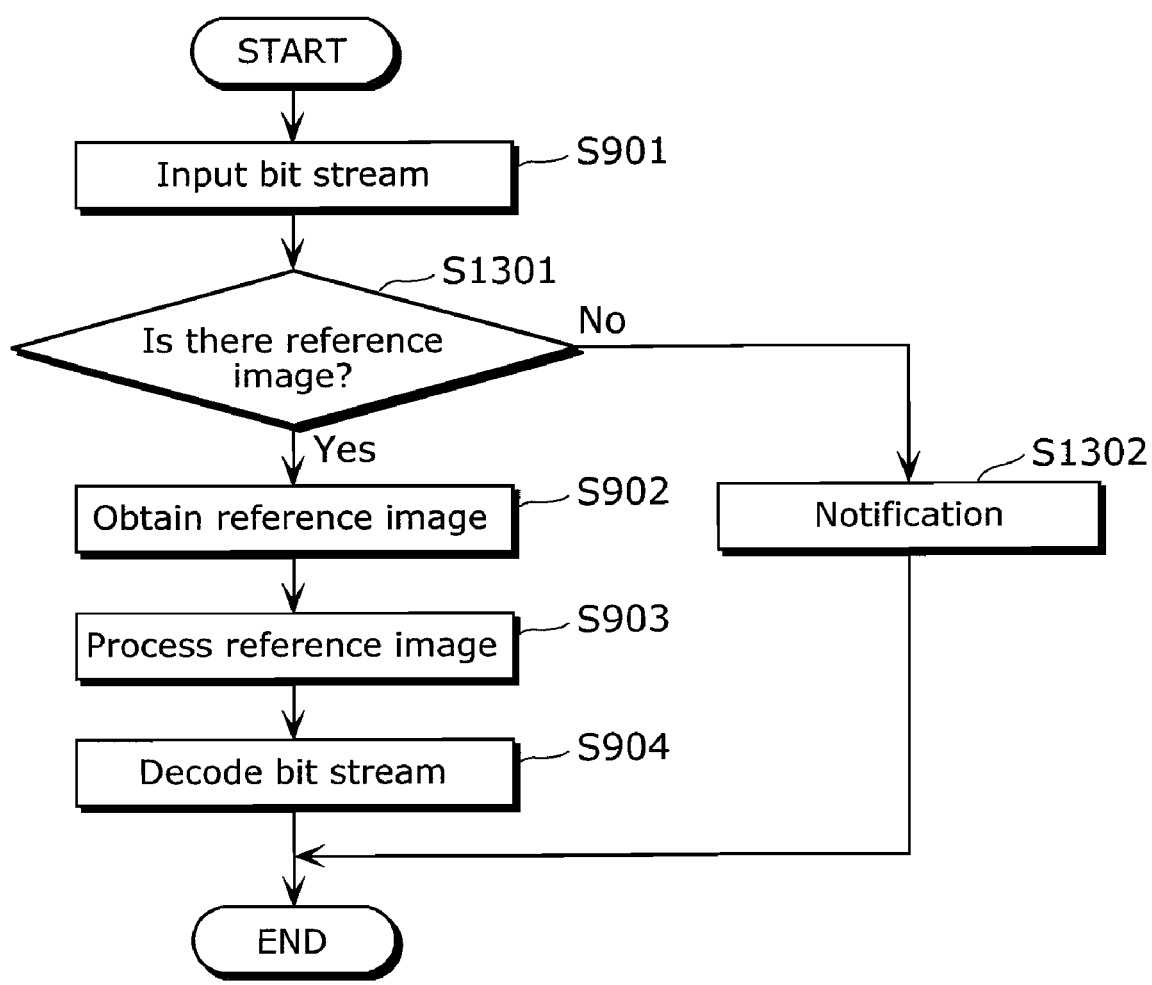
FIG. 14 is a flowchart for describing the image decoding method.

In addition, in the present embodiment, the order of processing shown in the flowchart in FIG. 14 may be used instead of the order of processing shown in the flowchart in FIG. 10. The order of processing in FIG. 14 is different from the processing in FIG. 10 in that steps S1301 and S1302 are added. More specifically, in the order of processing shown in FIG. 14, it is judged whether there is the reference image described in the bit stream (step S1301), and in the case where there is the reference image (Yes in S1301), the processing in step S902, S903, and S904 is performed. In addition, if there is no reference image (No in step S1301), the user is notified of the information (step S1302), and the decoding is terminated and the processing ends. With such processing, when decoding cannot be performed since there is no reference image, the user can be notified of the reason.

Third Embodiment

Figure 15:
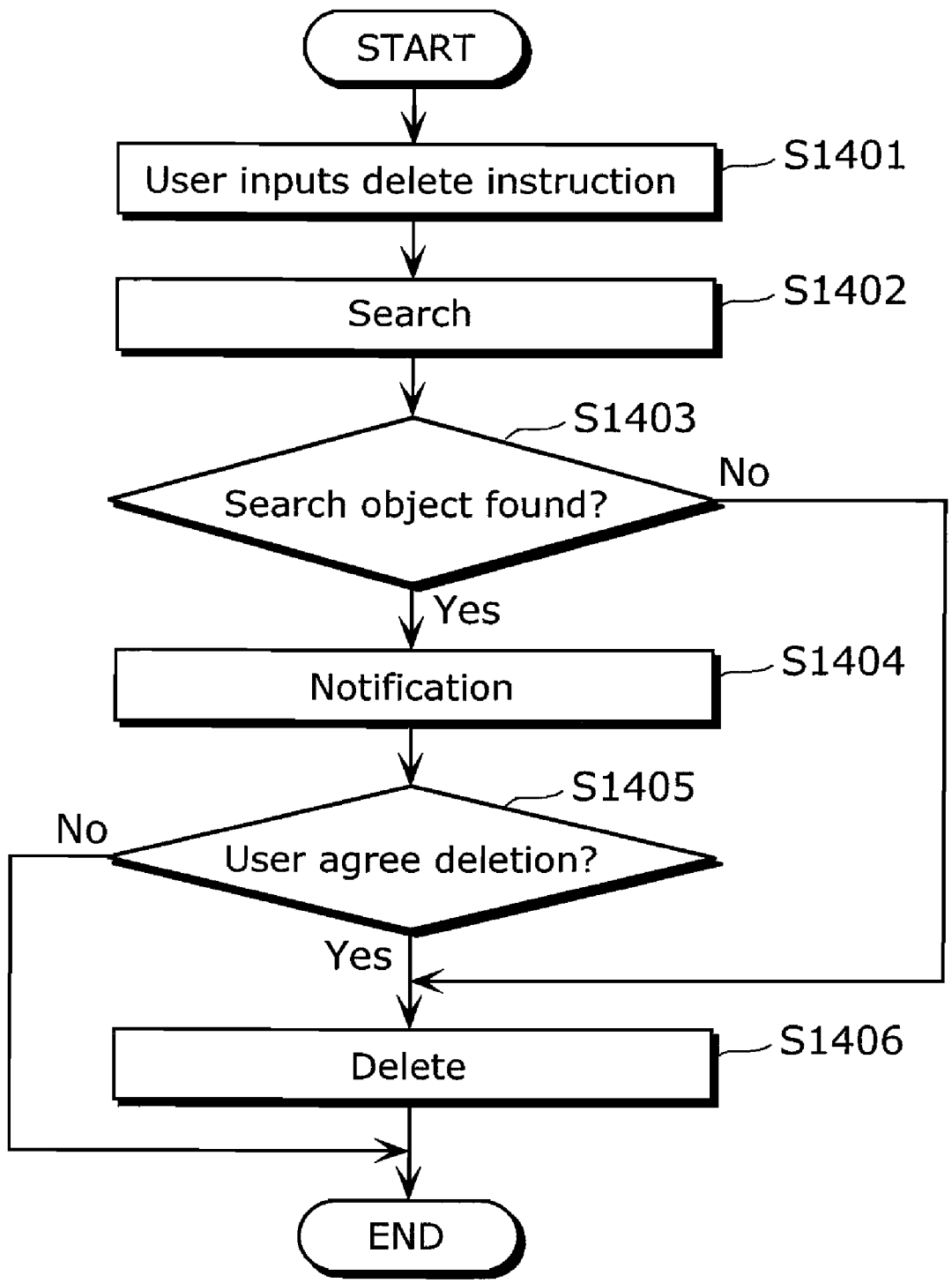
FIG. 15 is a flowchart for describing the data management method in the third embodiment.

FIG. 15 is a flowchart showing the order of processing in the data management method according to the present invention. The data management method according to the present invention is a method for handling image data on a device and a computer in which the image data (file) generated in the image coding method according to the present invention is stored (hereinafter simply referred to as devices).

When the user inputs an instruction for deleting an image in the device holding the image data (step S1401), the device searches "other image data which is coded using the image data to be deleted as the reference image" (step S1402). Here, the search can be performed, for example, by confirming the decoding method of all image data in the device one by one, or by creating a table showing the coding method of the image data in the device in advance and using the table. When the searched object is found (Yes in step S1403), the device notifies the user of the information, and confirms whether the image to be removed is removed or not (step S1404). When the user agrees the deletion (Yes in step S1405), the image to be deleted is deleted (step S1406). When the searched object is not found (No in step S1403), the image to be deleted is deleted (step S1406). In addition, when the user does not agree the deletion of the image to be deleted (No in step S1405), the processing ends without deleting the image to be deleted.

As described above, the data management method according to the present invention searches and checks whether there is the coded image when deleting the image data from the device by referring to the image data of the image to be deleted using the image coding method according to the present invention or not. When there is the searched image, the user is notified and it is confirmed whether the user agrees the deletion or not.

Thus, with the image decoding method according to the present invention, when the user tries to delete am image being referred to by an image coded in the image coding method according to the present invention, it is possible to notify the deletion of the user. With this, it is possible to prevent the image coded in the image coding method according to the present invention from being unable to be decoded.

Fourth Embodiment

Figure 16:
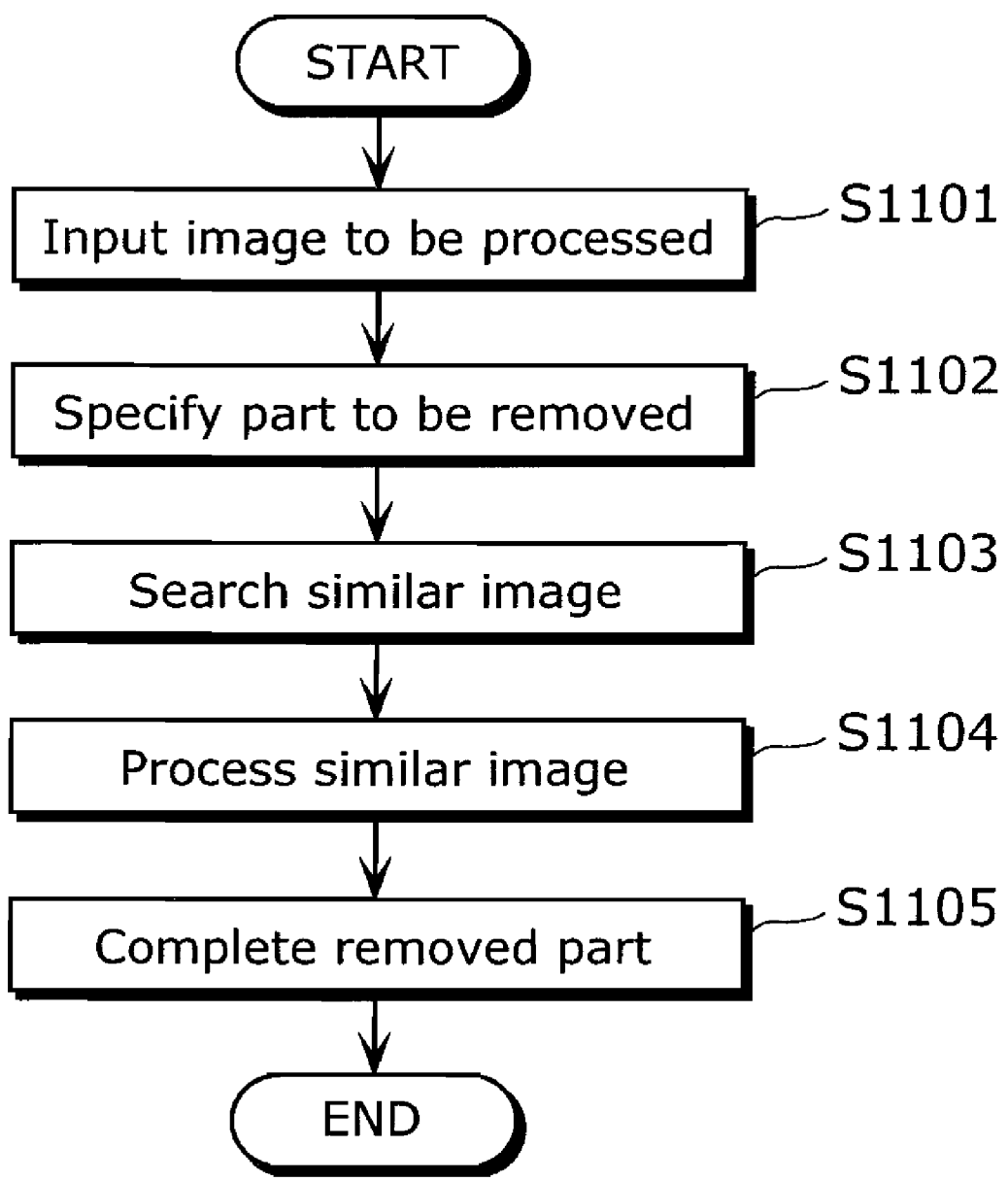
FIG. 16 is a flowchart showing the order of processing in the image processing method according to the fourth embodiment.
Figure 17:
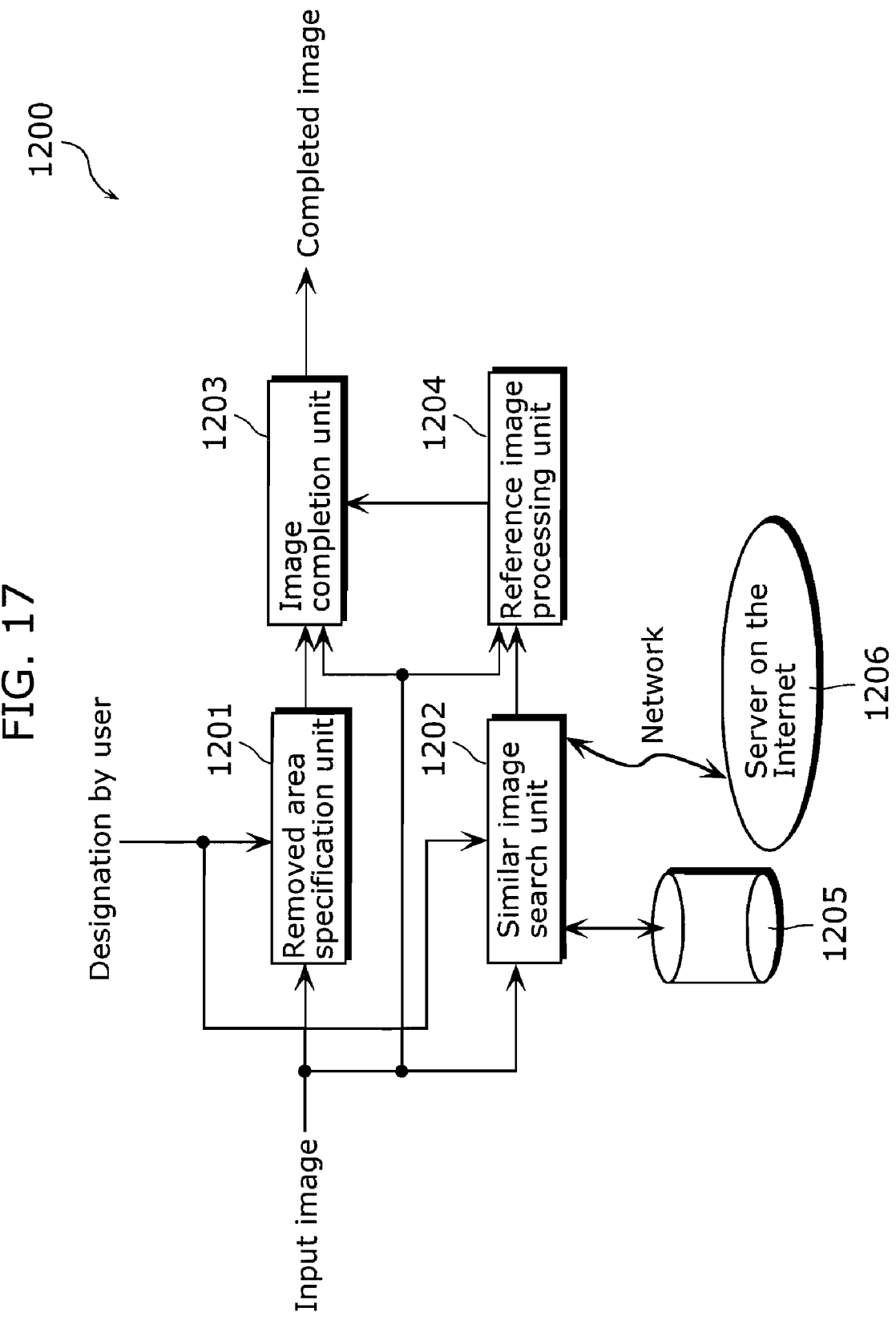
FIG. 17 is a block diagram showing the detail of processing of the image processing method.
Figure 18A:
FIG. 18A is a pattern diagram for describing the image processing method.
Figure 18B:
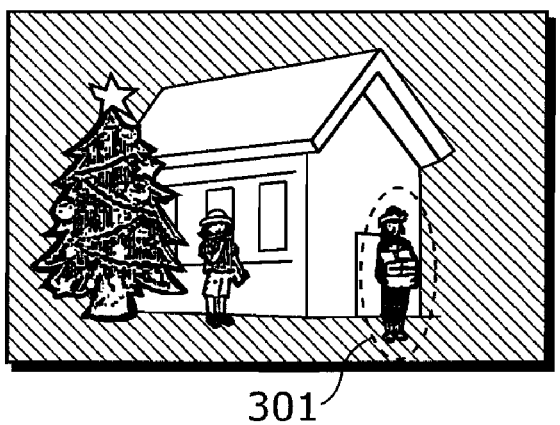
FIG. 18B is a pattern diagram for describing the image processing method.
Figure 18C:
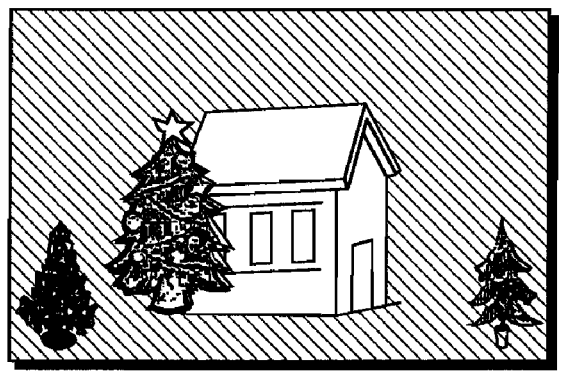
FIG. 18C is a pattern diagram for describing the image processing method.
Figure 18D:
FIG. 18D is a pattern diagram for describing the image processing method.
Figure 18E:
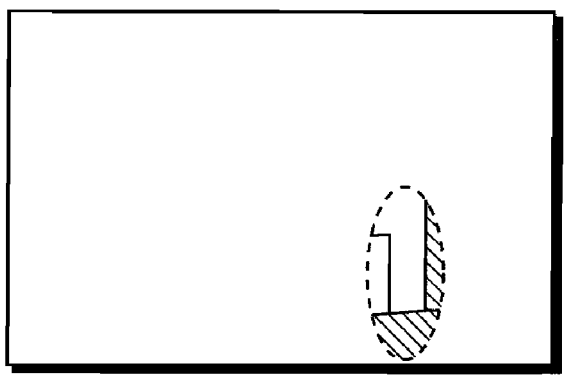
FIG. 18E is a pattern diagram for describing the image processing method.
Figure 18F:
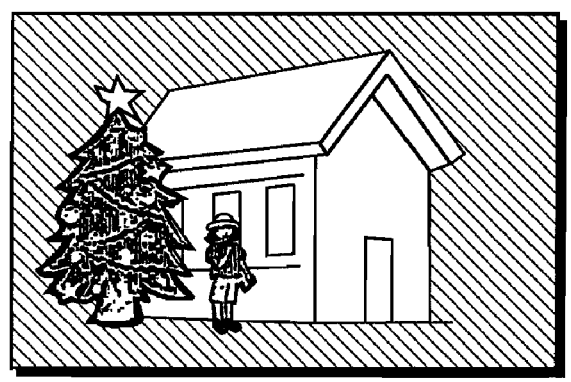
FIG. 18F is a pattern diagram for describing the image processing method.

FIGS. 16 and 17 are a flowchart and a block diagram respectively showing an order of processing in the image processing method according to the present invention. The image processing apparatus according to the present invention includes, as shown in FIG. 17, the removed area specification unit 1201, the similar image search unit 1202, the image completion unit 1203, and the reference image processing unit 1204. FIGS. 18A to 18F are pattern diagrams for describing the order of processing in the image coding method according to the present invention.

The input image (FIG. 18A) is inputted to the removed area specification unit 1201. The input image may be an image on which A/D conversion or image processing and the like is performed in a camera after the image is read out from an image sensor configured of a CCD device and a CMOS device, or may be an image taken by a digital camera and the like, or an image scanned by a scanner and the like, the image being read out from a recording medium (step S1101). In the removed area specification unit 1201, a part to be removed in the input image is specified based on the designation by the user and the image recognition results and others (step S1102). When the image recognition technology is employed, it is possible to specify the designation such as deleting a specific object or deleting a person other than a specific person is in the image. Here, inside the area to be removed 31 is specified as a part to be removed in the remove area specification unit 1201.

Subsequently, the input image is inputted to the similar image search unit 1202. The similar image search unit 1202 searches a similar image which is similar to the input image in the same manner as shown in FIG. 3. In the similar image search unit 1202, an image similar to the input image is searched and obtained from the images stored in the storage medium 1205 inside devices (cameras, personal computers, and video recorders and others) and images stored in the server 1206 on the Internet (Step S1103). When only the images stored inside the devices are used, despite a high search speed, the subjective image quality of the completed image may be slightly lower. On the other hand, when the images in the database or on the Internet are used, the subjective image quality is higher, however, searching may take time. Various conventional methods can be used for the method to search similar images. When searching the similar image, generally, a feature quantity is extracted from an image. In addition, the distance scale based on the feature quantity is defined. Furthermore, an image which is closer in the distance scale with the input image is selected as a similar image from the images stored in the storage medium and the server and the like. Here, when the keywords and the imaging location information obtained by the GPS and others, imaging date information and others are attached to the image as meta information, a search based on the keywords, the imaging location information and the imaging date information and others is performed, and then the images can be narrowed down with reference to the image feature quantity. For example, when the image was taken at a sightseeing area, an image similar to the input image can be extracted by using the name of the sightseeing area as the keyword, using the location of the sightseeing area as imaging location information, or by using the season or time as the imaging date information. Here, the similar image obtained by the similar image search unit 1202 may not be one, however, the following description is made assuming that one similar picture (FIG. 18C) is obtained for the simplicity of description. In addition, the similar image obtained by the similar image search unit 1202 is referred to as a reference image. In addition, when selecting the similar image, the area to be removed 31 may be taken in consideration. For example, when extracting the feature quantity, the feature quantity may be extracted by significantly weighting the area around the area to be removed 31, which is outside the area to be removed 31.

The reference image obtained in the similar image search unit 1202 is inputted to the reference image processing unit 1204. Even if the reference image is an image taken in the same location as the input image, the images are rarely taken in the same angle or the same size. Thus, the reference image processing unit 1204 transforms the reference image so that the reference image has the same angle and the same size as those of the input image (step S1104). Here, the description is made for the case where the reference image is transformed by the projection transformation (and the affine transformation) and the like, under the assumption that the distance between the camera and the subject is significantly longer than the depth of the subject (for example, 10 times longer or more). In this case, it is necessary to compute a projection transformation matrix between the input image and the reference image. Here, the correspondence relationship between the input image and the reference image is computed, and the projected transformation matrix is computed using the correspondence relationship. When computing the correspondence relationship between the input image and the reference image, a method, for example, for extracting feature points of both images using the Harris operator and the SIFT method to compute the correspondence relationship of the feature points In addition, when computing the projection transformation matrix from the correspondence relationship, using the method such as the least square method using the correspondence relationship of the inliers after outliers are detected from the correspondence relationship and removed. Methods such as the RANdom Sample Consensus (RANSAC) may be used for detecting the outliers.

Even if the reference image is an image taken in the same location as the input image, the brightness of the whole image generally varies depending on the camera used for imaging and the weather or the time when the image was taken. Thus, the reference image processing unit 1204 transforms the reference image so that the reference image has approximately the same brightness of the input image. In order to achieve this, for example, a method such as the conventional histogram matching and the like can be used.

The reference image processing unit 1204 transforms the reference image into a transformed reference image (FIG. 18D) by transforming the reference image using the computed (projection) transformation matrix or by adjusting the brightness of the reference image and outputs the transformed reference image to the image completion unit 1203.

The input image, the remove area information obtained in the remove area specification unit 1201, the transformed reference image obtained in the reference image processing unit 1204 are inputted to the image completion unit 1203. In the image completion unit 1203, a completed image (FIG. 18F) is generated by deleting the pixels in the remove area from the input image, extracting the pixels of the transformed reference image in the same location as with the remove area (FIG. 18E), and filling the pixels to the remove area in the input image (step S1105).

Figure 19A:
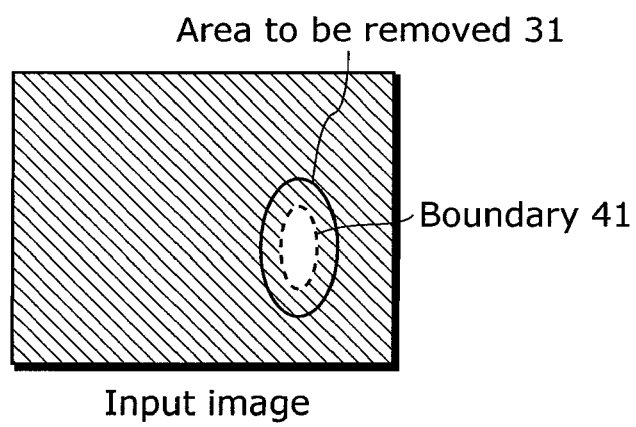
FIG. 19A is a pattern diagram for describing the image processing method.
Figure 19B:
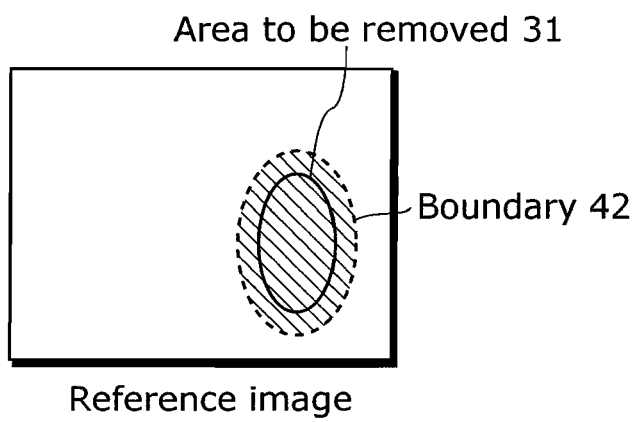
FIG. 19B is a pattern diagram for describing the image processing method.
Figure 19C:
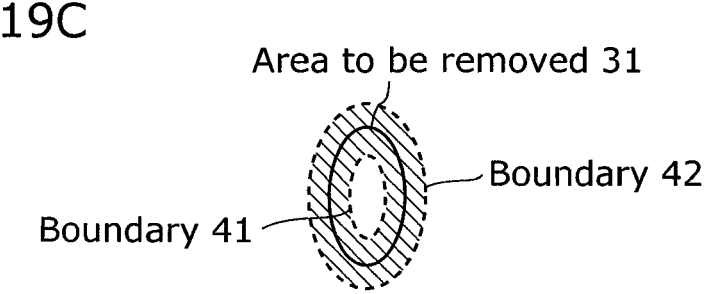
FIG. 19C is a pattern diagram for describing the image coding method.
Figure 19D:
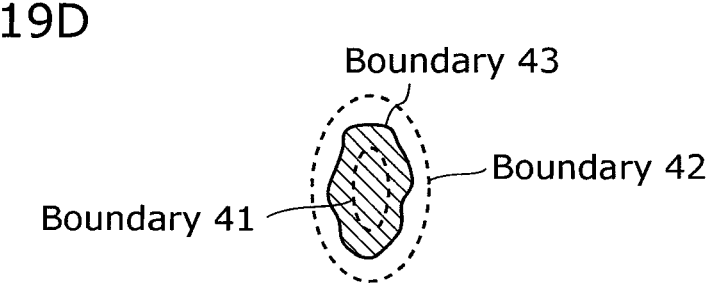
FIG. 19D is a pattern diagram for describing the image processing method.

When filling the pixels of the transformed reference image, the pixels may not be directly filled to the removed part. Instead, the pixels may be filled by having an overlapping part between the input image and the transformed reference image, and finding an appropriate boundary in the overlapping part, and obtaining the pixels from the transformed reference image along with the boundary to fill the input image. For example, FIG. 19A indicates a selected area of the input image, and the area outside the boundary 41 within the area to be removed 31 is determined to be the area to be left. FIG. 19B indicates a selected area of the reference image, and the area inside the boundary 42 which is outside the area to be removed 31 is determined to be the area to be left. FIG. 19C shows an overlapping area of the areas left in the input image and the reference image. FIG. 19D indicates a result showing an appropriate boundary 43 in the overlapping part. In this case, the pixels inside the boundary 43 are obtained from the reference image and the completed image (output image) is obtained by filling the pixels to the input image.

As described above, the image processing method according to the present invention searches a similar image which is similar to the input image from the images stored in the devices, the database, and the server on the Internet and obtains the image as a reference image when removing and filling the part of the images. The transformed reference image is generated after transforming the reference image so as to have the same size and the imaging angle as those of the reference image using the correspondence relationship between the input image and the reference image. Finally, the removed part of the input image is filled with the pixels of the transformed reference image, and a completed image is obtained.

Therefore, with the image processing method according to the present invention, a natural completed image can be generated when deleting and filling a part of the image taken by the digital camera and the like even when the removed part is to be completed with an image having a complex shape or when the removed part is to be filled with an image with a complex shape or the image which does not exist in the non-removed part.

Note that, in the present embodiment, the description is made that the transformation matrix of the reference image is computed in the reference image processing unit 1204 (step S1104), the transformation matrix may be computed in the similar image search unit 1202 (step S1103). In this case, when selecting a similar image from the stored images in the similar image search unit 1202 (step S1104), the transformation matrix from the input image to the stored image is computed, and the transformation matrix is set to be a basis for selecting the similar image. The transformation matrix corresponding to the selected similar image is outputted to the reference image processing unit 1204. In this case, in the reference image processing unit 1204 (step S1104), it is not necessary to calculate the transformation matrix. In addition, in the similar image search unit 1202 (step S1103), feature points are extracted by the Harris operator and the SIFT method, and a similar image may be obtained based on the reference relationship of the feature points. In the reference image processing unit 1204 (step S1104), a transformation matrix may be computed from the correspondence relationship of the feature points extracted in the similar image search unit 1202 (step S1103).

In addition, in the present embodiment, the description is made for the case where a similar image with respect to the input image is searched in the similar image search unit 1202 from the stored images based on the degree of similarity and the keyword and the like, however, the similar image may be selected by an explicit designation by the user from the stored images. In this case, the search using the degree of similarity, keywords and others, and the explicit selection by the user can be combined. For example, similar images can be narrowed down to a few by a search using the similarity, keywords and others, and an image with which the user prefers to use for coding the input image can be selected by the user. In such a method, despite the slight increase on the user's workload, the subjective image quality of the completed image is further likely to improve.

In addition, in the present embodiment, the description is made that the reference image is transformed to a transformed reference image using the transformation matrix in the reference image processing unit 1204 (step S1104), it is not necessary to perform the transformation. This may be applied, for example, to the case where the reference image is an image which is already similar to the input image. With this, the processing for transformation of the reference image can be reduced, as well as a slight image blur which occurs when transforming the reference image can be prevented.

In addition, in the present embodiment, the description has made for the case where the completed image is generated by removing the pixels in the removed area in the input image, extracting the pixels of the transformed reference image in the same location as in the removed area, and filling the pixels to the removed area of the input image. However, the pixels of the transformed reference image may not be directly filled with the removed area of the input image. For example, in the removed area of the input image, pixels may be filled so that the feature quantity other than the pixel value of the reference image (for example, first derivation and the second derivation of the pixel value) matches. With such processing, the processing amount slightly increases, however, a completed image with higher image quality can be generated.

Note that the image completed in the present embodiment may be compressed in the image coding apparatus according to the first embodiment. In this case, the image processing apparatus may have a configuration shown in the block diagram of FIG. 17 with the coding processing unit 202 and the reference image information processing unit 204 are added. The coding processing unit 202 performs compression coding of the completed still image outputted from the image completion unit 1203 using the reference image generated from the reference image processing unit 1204.

Fifth Embodiment

Figure 20B:
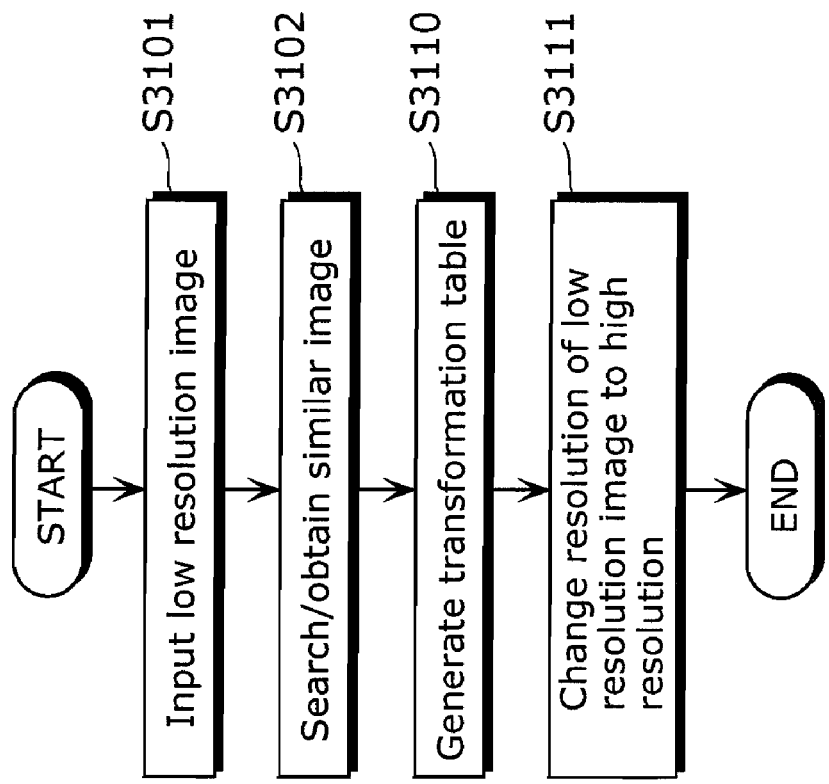
FIG. 20B is a flowchart showing the order of processing in the image processing method.
Figure 20A:
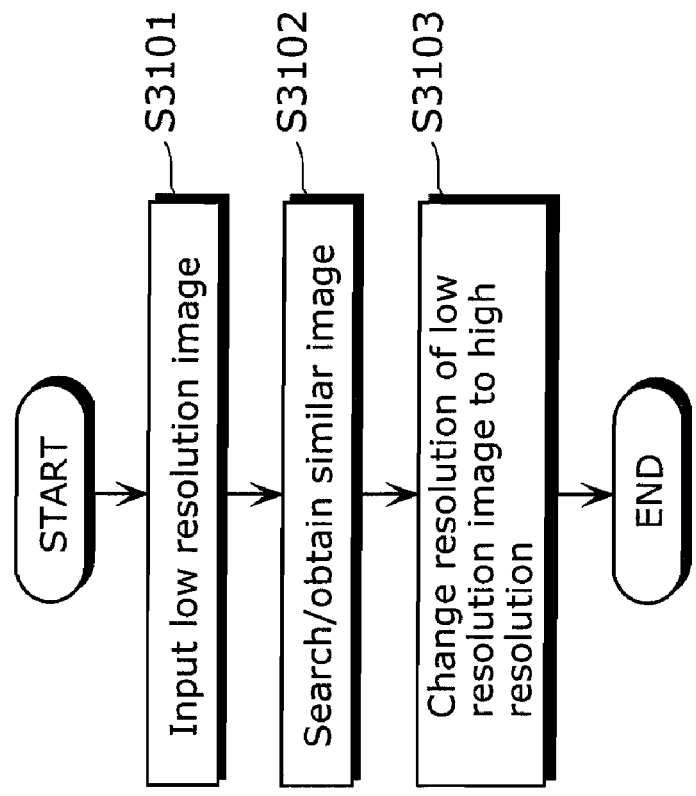
FIG. 20A is a flowchart showing the order of processing in the image processing method in the fifth embodiment.

FIGS. 20A and 21 are respectively a flowchart and a block diagram showing an order of processing in the image processing method according to the present invention. As shown in FIG. 21, the image processing apparatus according to the present information includes a super resolution processing unit 3201, and a similar image search unit 3202. In addition, FIGS. 22A to 22D are pattern diagrams for describing the order of image processing in the image coding method according to the present invention.

The low resolution image (FIG. 22A) which is the input image is inputted to the similar image search unit 3202 (step S3101). The similar image search unit 3202 searches an image which is similar to the input image in the same mariner as shown in FIG. 3. In the similar image search unit 3202, a similar image similar to the input image is searched and obtained from the images stored in the storage medium 3203 inside the devices (cameras, personal computers, and video recorders and others) and images stored in the server 3204 on the Internet (Step S3102). When only images recorded in the devices are used, the subjective image quality of the high resolution image obtained in the end may be slightly lower despite the high search speed, while when images on the database or the Internet are used, it may take time to search although the subjective image quality may be higher. Various conventional methods can be used for the method to search the similar images.

When searching the similar image, generally, a feature quantity is extracted from an image. In addition, the distance scale based on the feature quantity is defined. Furthermore, an image which is closer in the distance scale with the input image is selected from the images stored in the storage medium and the server and the like.

Figure 22A:
FIG. 22A is a pattern diagram for describing the image processing method.
Figure 22B:
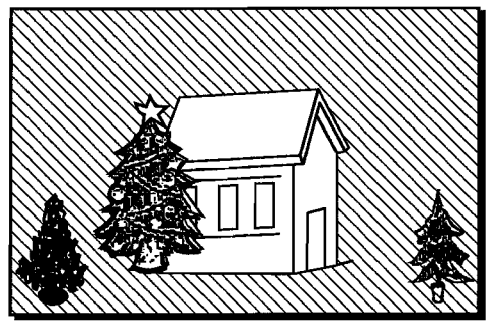
FIG. 22B is a pattern diagram for describing the image processing method.
Figure 22C:
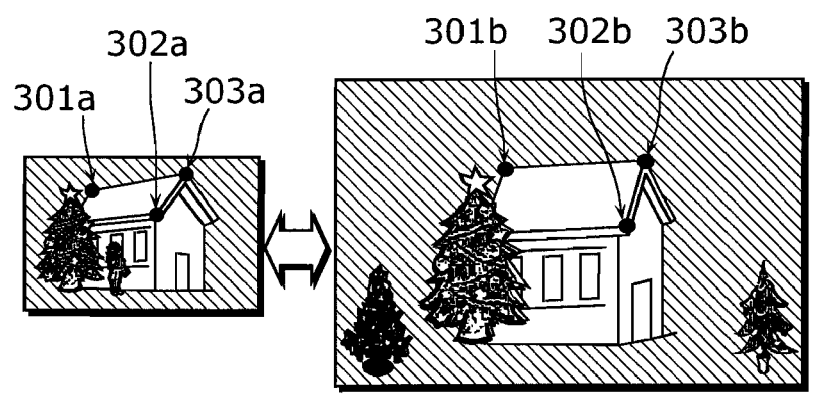
FIG. 22C is a pattern diagram for describing the image processing method.
Figure 22D:
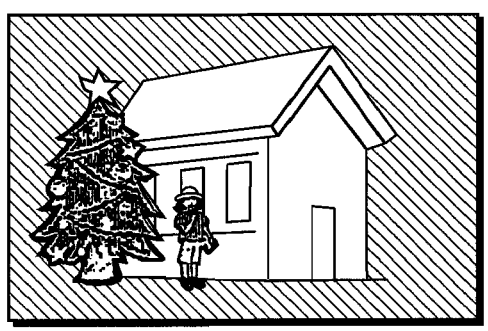
FIG. 22D is a pattern diagram for describing the image processing method.

When selecting a similar image, an image with higher resolution is selected rather than a low resolution image. The correspondence relationship between the low resolution image and a similar image may be used for selecting an image with higher resolution. When computing the correspondence relationship between the input image and the reference image, a method, for example, for extracting feature points of both images using the Harris operator and the SIFT method to compute the reference relationship of the feature points It is assumed that FIG. 22A is a low resolution image, and FIG. 22 B is a similar image. FIG. 22C shows FIG. 22A on the left and FIG. 22B on the right, and some of feature points are shown in black circles in the figure. Among these feature points, 301a and 301b, 302a and 302b, and 303a and 303b show the correspondence relationship of the feature points. In this case, if the distance between the corresponding points in the similar image (for example, the distance between 301b and 302b) is longer than the distance between the corresponding points in the low resolution image (for example, the distance between 301a and 302a), it indicates that the similar image is a high resolution image. Here, the distance is represented by the number of pixels. In addition, it is assumed that the distance between the camera and the subject is significantly longer than the depth of the subject (for example, 10 times longer or more), and an image with small degree of transformation may be selected by obtaining a projection transformation (or the affine transformation) parameters between the low resolution image and the reference image. In this case, the correspondence relationship between the input low resolution image and the reference image is computed, and the projected transformation matrix is computed using the correspondence relationship. When computing the correspondence relationship between the input image and the reference image, a method, for example, for extracting feature points of both images using the Harris operator and the SIFT method to compute the reference relationship of the feature points In addition, when computing the projection transformation matrix from the correspondence relationship, using the method such as the least square method using the correspondence relationship of the inliers, after outliers are detected from the correspondence relationship and removed. Methods such as the RANdom Sample Consensus (RANSAC) may be used for detecting the outliers.

Here, when the keywords, the imaging location information obtained by the GPS and others, imaging date information and others are attached to the image as meta information, a search based on the keywords, the imaging location information and the imaging date information and others is performed, and then the images can be narrowed down with reference to the image feature quantity. For example, when the image was taken at a sightseeing area, an image similar to the input image can be extracted by using the name of the sightseeing area as the keyword, using the location of the sightseeing area as imaging location information, or by using the season or time as the imaging date information. Here, the similar image obtained by the similar image search unit 3202 may not be one, however, following description is made assuming that one similar picture (FIG. 22B) is obtained for the simplicity of description. In addition, the similar image obtained by the similar image search unit 3202 is referred to as a reference image.

The reference image obtained in the similar image search unit 3202 is also inputted to the super resolution processing unit 3201. In addition, a low resolution image is inputted to the super resolution processing unit 3201. The super resolution processing unit 3201 adjusts the low resolution image to a high resolution using the reference image as a model, and generates a high resolution image (step S3103, FIG. 22D). In such a case, the methods shown in the articles by A. Hertzmann, C. Jacobs, N. Oliver, B. Curless, D. Salesin, "Image Analogies", and by S. Baker and T. Kanade, "Limits on Super-Resolution and How to Break Them" can be used. The generated high resolution image is outputted from the super resolution processing unit 3201.

As described above, the image processing method according to the present invention searches an image which is similar to the input image from the images stored in the devices, the database, and the server on the Internet and obtains the image as a reference image when changing the resolution of a low resolution image to a high resolution. A high resolution image is generated by using the reference image as a model image and performing super resolution image processing on the low resolution image.

Therefore, the resolution of a low resolution image can be changed to a high resolution by using the image processing method according to the present invention even when the high resolution image to be a model is not obtained in advance.

Variation of Fifth Embodiment

A variation of the fifth embodiment can be implemented as described below.

Figure 23:
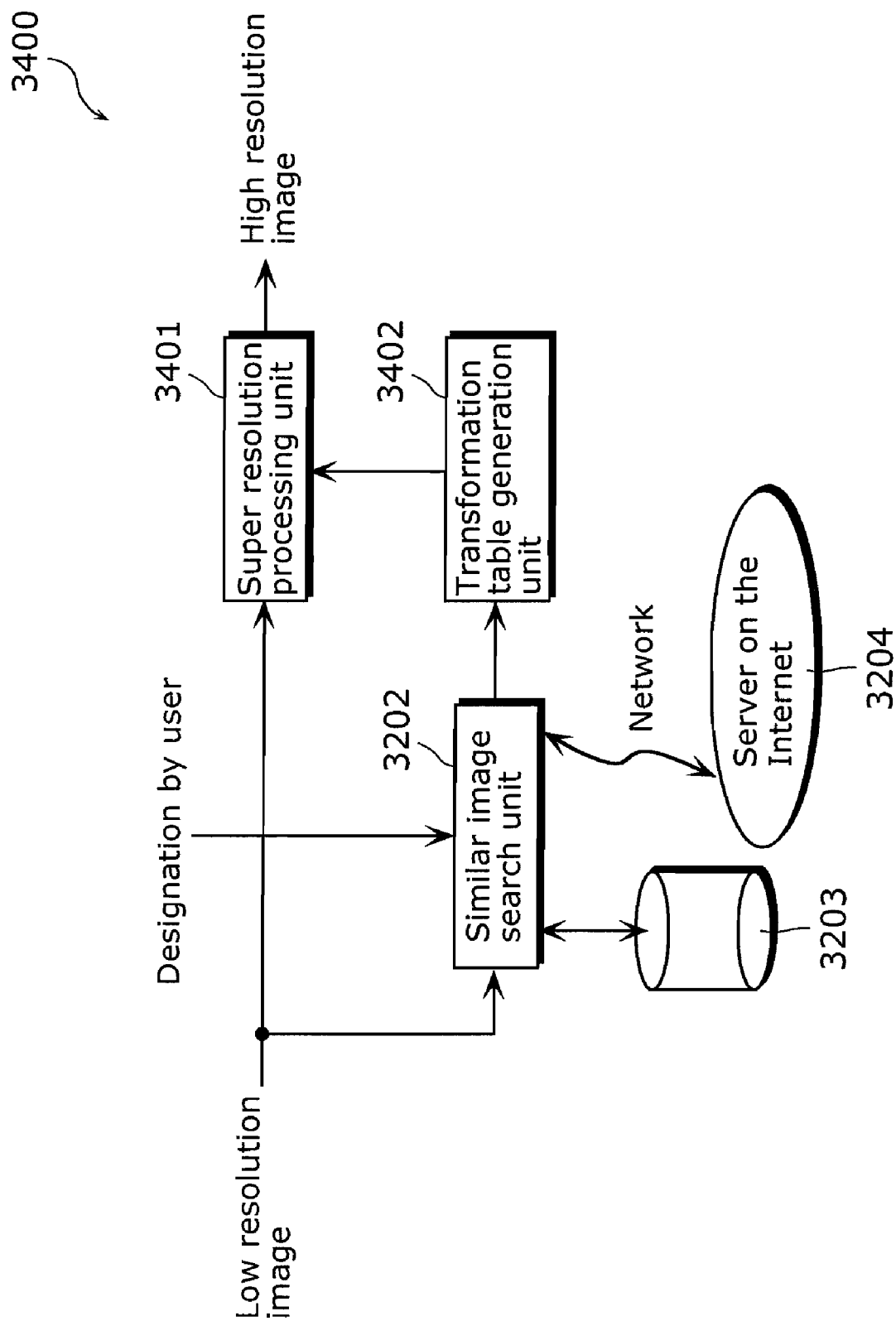
FIG. 23 is a block diagram for describing the image decoding method.

FIGS. 20B and 23 are respectively a flowchart and a block diagram showing an order of processing in the image processing method in the variation. As shown in FIG. 23, the image processing apparatus according to the present information includes a super resolution processing unit 3401, and a similar image search unit 3202, and a transformation table generation unit 3402.

The low resolution image (FIG. 22A) which is the input image is inputted to the similar image search unit 3202 (step S3101). The description for the processing in the similar image search unit 3202 (step S3102) is omitted since the processing is the same as the fifth embodiment. The reference image obtained in the similar image search unit 3202 (FIG. 22B) is inputted to the transformation table generation unit 3402.

The transformation table generation unit 3402 generates a transformation table using the inputted reference image (step S3110). The transformation table is a table showing a relationship between the low resolution component and the high resolution component of the reference image, and a method such as the method shown in the article by W. T. Freeman, T. R. Jones and E. C. Pasztor, "Example-based Super-Resolution". Furthermore, a table indicating a relationship between the low frequency component and the high frequency component of the reference image may be generated using the wavelet transformation or the Fourier transformation. The generated transformation table is outputted to the super resolution processing unit 3401.

The low resolution image and the transformation table are inputted to the super resolution processing unit 3401. The super resolution processing unit 3401 changes the resolution of the low resolution image to a high resolution using the transformation table, and generates a high resolution image (step S3111, FIG. 22D). Here, the resolution of the image can be changed to a high resolution with a method suitable for the transformation table generated in the transformation table generation unit 3402. For example, when the transformation table is generated using the method in the article by W. T. Freeman, T. R. Jones and E. C. Pasztor, "Example-based Super-Resolution", the resolution of the image can be changed to high resolution in the method presented in the article.

As described above, in this variation, an image which is similar to the input low resolution image is searched from the images stored in the devices, the database, the server on the Internet and the image is obtained as a reference image when changing the resolution of a low resolution image to a high resolution. Furthermore, a high resolution image is generated by generating a transformation table for generating a high resolution image from a low resolution image using the reference image, and performing super resolution image processing for the low resolution image using the transformation table.

Therefore, the resolution of a low resolution image is changed to a high resolution by using the image processing method according to the present invention even when the high resolution image to be a model is not obtained in advance or when there is no transformation table suitable for the input low resolution image.

Note that, in the present embodiment, the description is made for the case where a similar image for the input image is searched in the similar image search unit 3202 from the stored images based on the degree of similarity and the keyword and the like, however, the similar image may be selected by an explicit selection of the user from the stored images. In this case, the search using the degree of similarity, keywords and others, and the explicit selection of the user can be combined. For example, similar images can be narrowed down to a few by a search using the degree of similarity, keywords and others, and the images are displayed on the screen (not shown in FIGS. 21 and 23). The user designates an image which the user prefers to use for completing the input image. In such a method, despite the slight increase on the user's workload, the subjective image quality of the high resolution image is further likely to improve.

In addition, in the variation, the description is made for the case where a similar image is obtained and used as the reference image. However, multiple similar images can be obtained in the similar image search unit 3202 and used as reference images in the super-resolution processing unit 3201 and the transformation table generation unit 3402.

Note that resolution of the image changed to high resolution in this variation may be compressed in the image coding apparatus according to the first embodiment. In this case, the image processing apparatus may have a configuration shown in the block diagram of FIG. 21 with the coding processing unit 202 and the reference image information processing unit 204 of FIG. 1. The coding processing unit 202 performs compression coding of the still image changed to high resolution outputted from the super resolution processing unit 3201 using the reference image provided from the similar image search unit 3202.

Furthermore, the reference image processing unit 203 may be added to the image processing apparatus. The reference image processing unit 203 performs a predetermined transformation to the similar image outputted from the similar image search unit 201, and the transformed similar image is provided to the coding processing unit 202 as the reference image. Here, in the predetermined transformation processing, at least one of the size or the imaging angle of the subject image included in the similar image is transformed to match the subject image included in the input image.

With this, the resolution of the first still image can be changed to a high resolution, and furthermore, can be coded at a high compression rate. For example, although the resolution of the first still image is changed to high resolution, the file size after coding can be reduced.

Sixth Embodiment

Recording a program for implementing the image coding method, the image decoding method and the data management method shown in the embodiments to a recording medium such as flexible disks enables an easy implementation of the processing shown in each of the embodiments in an individual computer system.

Figure 24A:
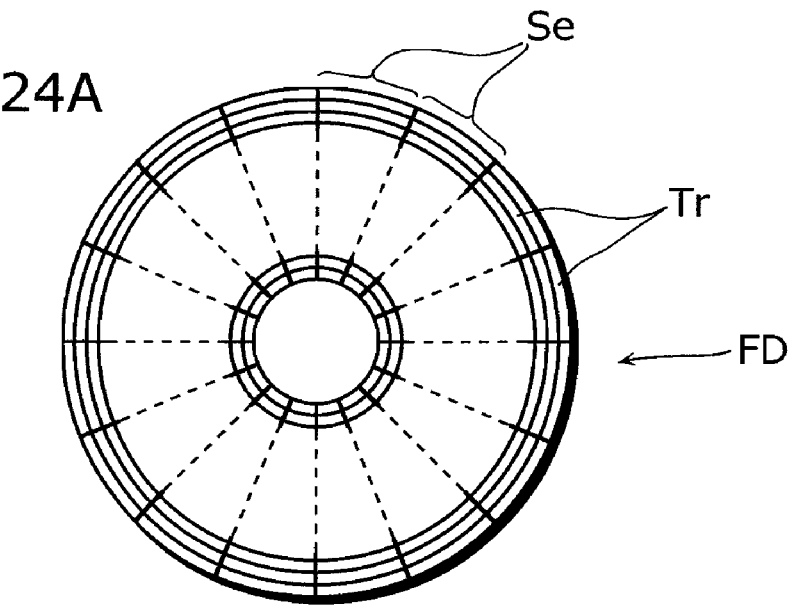
FIG. 24A is a explanatory diagram showing a recording medium for storing a program to implement, by a computer system, the image coding method, the image decoding method and the data management method according to the embodiments of the present invention.
Figure 24B:
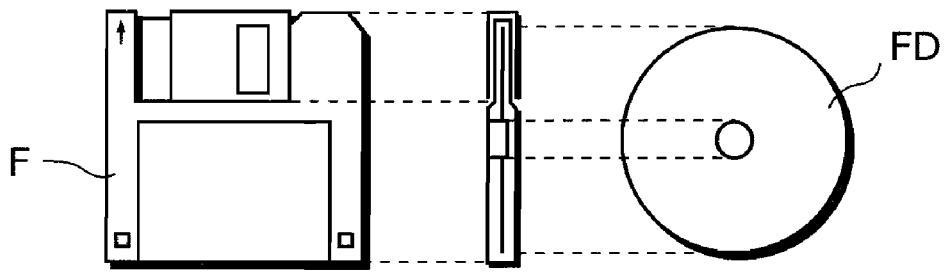
FIG. 24B is a explanatory diagram showing a recording medium for storing a program to implement, by a computer system, the image coding method, the image decoding method and the data management method according to the embodiments of the present invention.
Figure 24C:
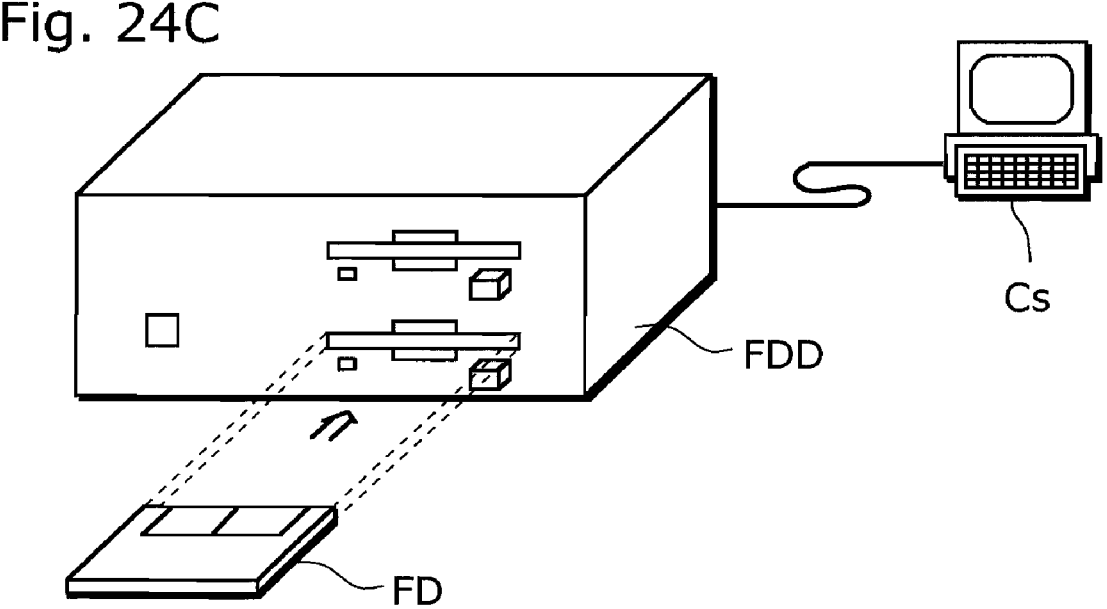
FIG. 24C is a explanatory diagram showing a recording medium for storing a program to implement, by a computer system, the image coding method, the image decoding method and the data management method according to the embodiments of the present invention.

FIGS. 24A to 24C are explanatory diagrams showing the image coding method, the image decoding method and the data management method is implemented on a computer system using a program recorded in a storage medium such a flexible disk and the like.

FIG. 24B shows an external view from the front and a cross section structure of a flexible disk, and the flexible disk. FIG. 24A shows an example of a physical format of the flexible disk which is the main body of the storage medium. The flexible disk FD is embedded in the case F, multiple tracks Tr is formed on the top surface of the disk, in concentric circles from the outer periphery to the inner periphery, and each of the tracks are divided into 16 sectors Se in the angular orientation. Accordingly, in the flexible disk in which the program is stored, the program is recorded on the area allocated on the flexible disk FD.

In addition, FIG. 24C shows a configuration in order to recode and reproduce the program on the flexible disk FD. When recording the image coding method, the image decoding method and the data management method on the flexible disk FD, the program is written from the computer system Cs via the flexible disk drive. In addition, when developing the image coding method, the image decoding method and the data management method in the computer system with the program on the flexible disk, the program is read out from the flexible disk drive and transferred to the computer system.

Note that, in the description above, the description has been made using the flexible disk as a storage medium, the same processing can be performed using an optical disk. In addition, the storage medium may not be limited to them; however, the same processing can be performed by a medium in which a program can be stored, such as an IC card and a ROM cassette and others.

Seventh Embodiment

Furthermore, an example application of the image coding method, the image decoding method and the data management method shown in the embodiments above and a system using the methods are described.

Figure 25:
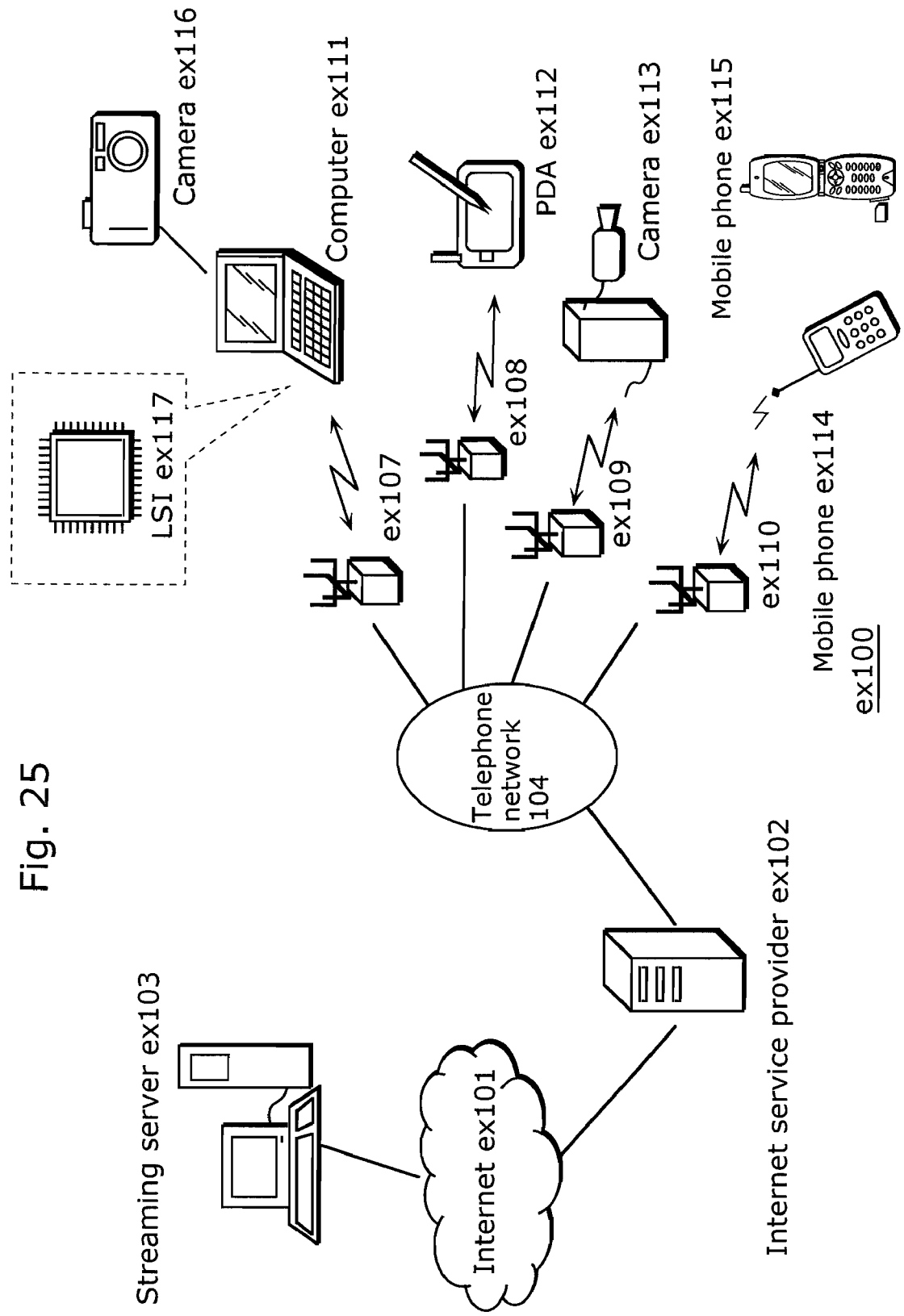
FIG. 25 is a block diagram showing the entire configuration of the content supply system.

FIG. 25 is a block diagram showing the entire configuration of a content supply system ex100 which implements a contents distribution service. The service area of a communication service is divided into a desired size, and base stations ex107 to ex110 which are fixed wireless stations are installed in each of the cells.

Stations ex107 to ex110, devices such as a computer ex111, a personal digital assistant (PDA) ex112, a camera ex113, a mobile phone ex114, and a mobile phone with camera ex115 are connected to the content supply system ex100 via the Internet ex101, an internet service provider ex102, and a phone network ex104.

However, the content supply system ex100 may not be limited to the combination shown in FIG. 25, and any of the devices may be combined and connected. In addition, without passing through the stations ex107 to ex110 which are the fixed wireless stations, the devices may be directly connected to the phone network ex104.

The camera ex113 is a device such as a digital video camera and the like capable of taking a moving picture. In addition, the mobile phone may be a mobile phone in any of: Personal Digital Communication (PDC); Code Division Multiple Access (CDMA); Wideband-Code Division Multiple Access (W-CDMA); or Global System for Mobile Communications (GSM) or may also be a Personal Handyphone system (PHS).

In addition, the streaming server ex103 is connected from the camera ex113 via the station ex109 and the phone network ex104, which enables live delivery and the like based on the coded data transmitted by the user using the camera ex113. The captured data may be coded in the camera ex113 or a server which transmits the data. In addition, the moving picture data captured by the camera 116 may be transmitted to the streaming server ex103 via the computer ex111. The camera ex116 is a device which is capable of taking a still image and a moving picture, such as a digital camera. In this case, coding of the moving picture data may be performed on the camera ex116 or the computer ex111. In addition, the coding is performed on an LSI ex117 included in the computer ex111 and the camera ex116. Note that, the software for image coding and decoding may be incorporated into a storage media (CD-ROM, a flexible disk, a hard disk and the like) which is a recording medium that is readable by the computer ex111 and the like. Furthermore, the moving picture data may be transmitted by the mobile phone with camera ex115. The moving picture data is the data coded in the LSI included in the mobile phone ex115.

In the content supply system ex100, while the content taken in the camera ex116 and others (such as images of a music live) is transmitted to the streaming server ex103 after coding is performed in the same manner as described in the embodiments, the streaming server ex103 distributes the content in stream to the client which made a request. The clients include the computer ex111, the PDA ex112, the camera ex113 and the mobile phone ex114 and others which are capable of decoding the coded data. In this manner, the content supply system ex100 is a system in which the coded data is received and reproduced by the client. Furthermore, by receiving in real time and decoding and reproducing the coded data enables individual broadcast.

For coding and decoding in each of the device included in the system, the image coding device and the image decoding device shown in each of the embodiment may be used.

A mobile phone is described as an example.

Figure 26:
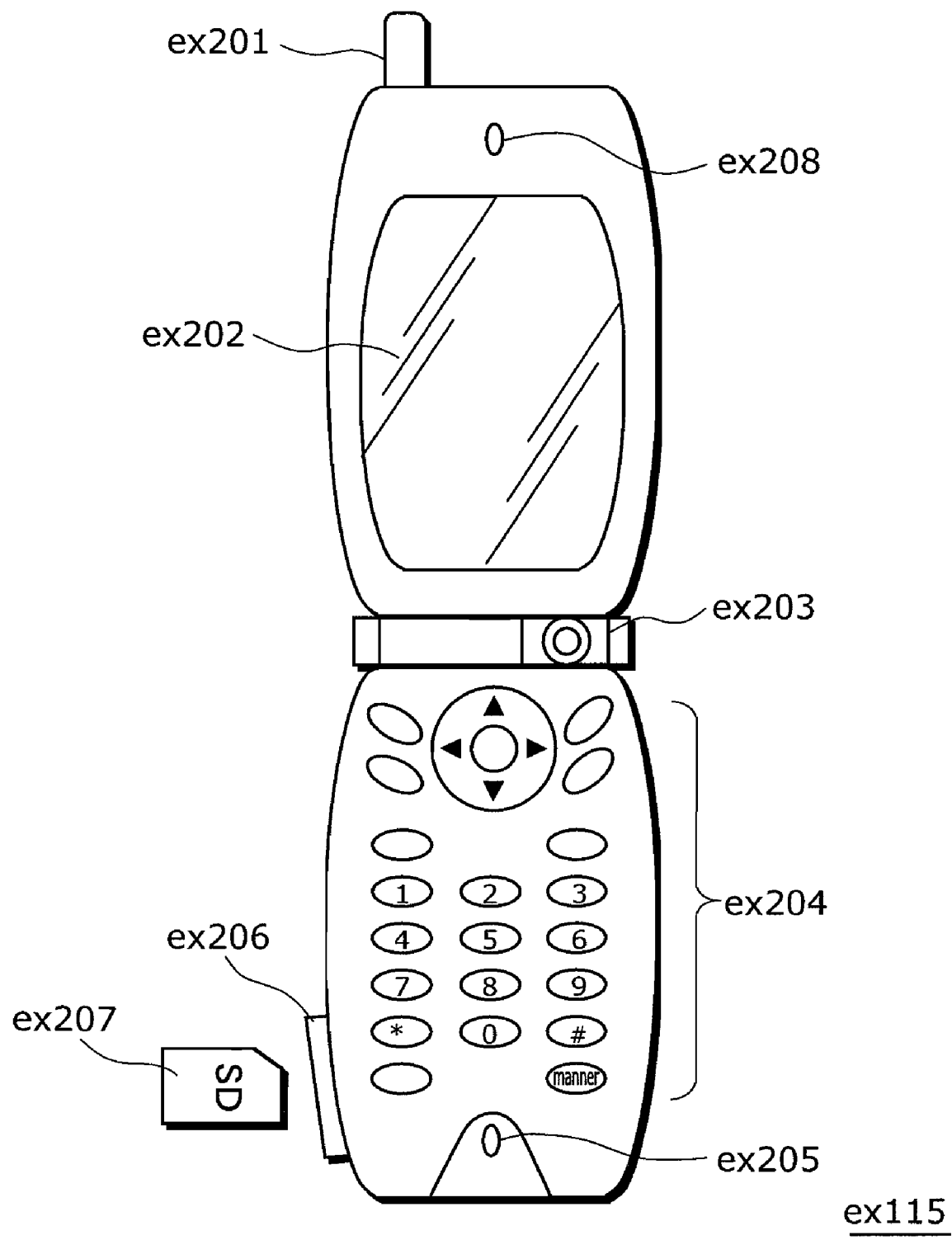
FIG. 26 is a diagram showing a mobile phone in which the image coding method, the image decoding method and the data management method are used.

FIG. 26 is a diagram showing the mobile phone ex115 in which the image coding method, the image decoding method and the data management method described in the embodiments above are employed. The mobile phone ex115 includes a main body unit having: an antenna ex201 for transmitting radio wave to/from the base stations; a camera unit ex203 such as a CCD camera capable of taking videos and still images; a display unit ex202 such as an LCD for displaying images taken in the camera unit ex203 and the decoded data of videos and the like received in the antenna ex201; and operation keys ex204, an audio output unit ex208 such as a speaker for audio output, the audio input unit ex205 for audio input, a storage media ex207 for saving coded data or decoded data such as the data of captured moving picture and taken still images, the data of received mail, the data of moving picture and the data of sill images, and a slot ex206 which makes the storage media ex207 attachable to the mobile phone ex115. The storage media ex207 is, for example, an SD card and the like which stores a flash memory device which is a type of Electrically Erasable and Programmable Read Only Memory (EEPROM) which is a nonvolatile memory capable of electric rewriting and erasing in a plastic case.

Figure 27:
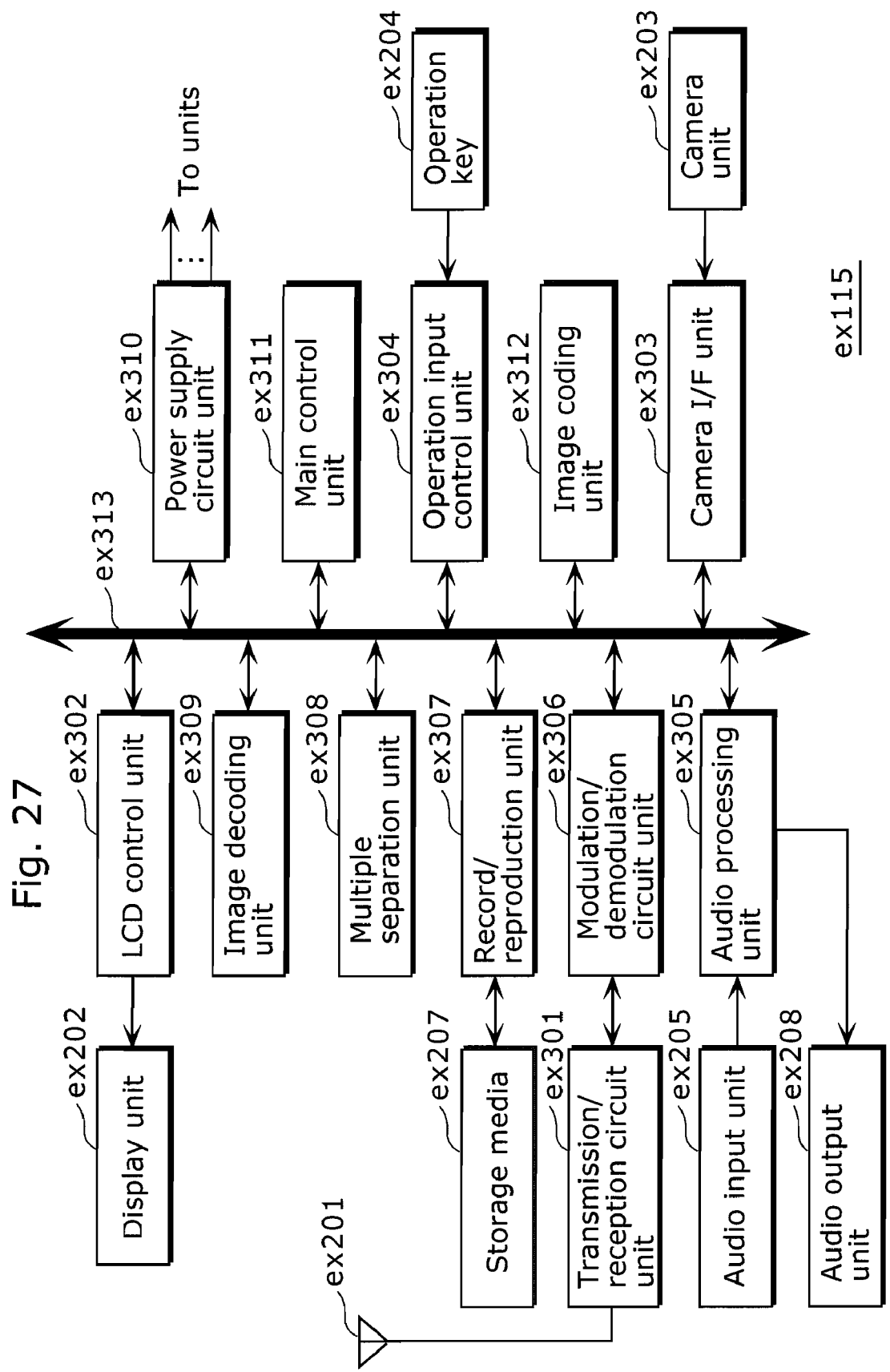
FIG. 27 is a block diagram showing a mobile phone.

Furthermore, the mobile phone ex115 is described with reference to FIG. 27. In the mobile phone ex115, the main control unit ex311 which generally controls each unit in the main body part including the display unit ex202 and the operation key ex204 is mutually connected to the power supply circuit unit ex310, the operation input control unit ex304, the image coding unit ex312, the camera I/F unit ex303, the LCD control unit ex302, the image decoding unit ex309, the multiple separation unit ex308, the record/reproduction unit ex307, the modulation/demodulation circuit unit ex306 and the audio processing unit ex305 via a synchronous bus ex313.

The power supply circuit unit ex310 activates the digital mobile phone with camera to an operable state by supplying power to each unit from the battery pack when the call is finished and the power key is turned on by the operation of a user.

The mobile phone ex115 converts the audio signals collected in the audio input unit ex205 in the audio call mode into digital audio data by the audio processing unit ex305, performs spread spectrum on the digital audio data in the modulation/demodulation circuit unit, and transmits the data after digital/analog conversion and frequency conversion is performed on the transmission/reception circuit unit ex301 via the antenna ex201. In addition, the mobile phone ex115 performs a frequency conversion and an analog/digital conversion by amplifying the reception signal received in the antenna ex201, perform inverse spread spectrum processing in the modulation/demodulation circuit unit ex306, and after conversion to analog audio signals in the audio processing unit ex305, the signals are outputted via the audio output unit ex208.

Furthermore, when sending an e-mail in the data communication mode, the text data of the e-mail inputted when the operation key ex204 is outputted to the main control unit ex311 via the operation input control unit ex204. The main control unit ex311 performs a spread spectrum processing in the modulation/demodulation circuit unit ex306, and transmits the text data to the station ex110 via the antenna ex201 after the digital/analog conversion and the frequency conversion in the transmission/reception circuit unit ex301.

When transmitting image data in the data communication mode, the camera unit ex203 supplies the image data taken in the camera unit ex203 to the image coding unit ex312 via the camera interface unit ex303. In addition, when the image data is not transmitted, the image data taken in the camera unit ex203 can be directly displayed in the display ex202 via the camera I/F unit ex303 and the LCD control unit ex302.

The image coding unit ex312 includes the image coding apparatus described in the present invention, the image data supplied from the camera unit ex203 is converted to coded image data by coding the image data in the coding method used for the image coding apparatus shown in the embodiments above, and transmits the coded image data to the multiple separation unit ex308. In addition, the mobile phone ex115 transmits the audio collected in the audio input unit ex205, when imaging in the camera unit ex203, to the multiple separation unit ex308 as digital audio data via the audio processing unit ex305.

The multiple separation unit ex308 multiplexes coded image data supplied from the image coding unit ex312 and the audio data supplied from the audio processing unit ex305, and performs spread spectrum on the multiplexed data obtained in the modulation/demodulation circuit unit ex306, and transmitted via the antenna ex201 after the digital/analog conversion processing and the frequency conversion processing in the transmission/reception circuit unit ex301.

When receiving the data of moving picture file linked to a website and others in the data communication mode, the inverse spread spectrum processing is performed, in the modulation/demodulation circuit unit ex306 on the received signal received from the station ex110, and the obtained multiplexed data is transmitted to the multiple separation unit ex308.

In addition, in order to decode the multiplexed data received via the antenna ex201, the multiple separation unit ex308 separates the multiplexed data into the coded bit stream of the image data and the coded bit stream of the audio data, and supplies the coded image data to the image decoding unit ex309 and supplies the audio data to the audio processing unit ex305 via the synchronous bus ex313.

Next, the image decoding unit ex309 has a configuration described in the present invention. Reproduction moving picture data is generated by decoding the coded bit stream of the image data in the coding method corresponding to the coding method shown in the embodiments above, supplying the reproduction moving picture data to the display unit ex202 via the LCD control unit ex302. With this, for example, the moving picture data included in a moving picture file linked to a website is displayed. At this time, the audio processing unit ex305 converts the audio data to analog audio signals and supplies the analog signals to the audio output unit ex208. With this, for example, audio data included in the moving picture file linked to a website is reproduced.

Figure 28:
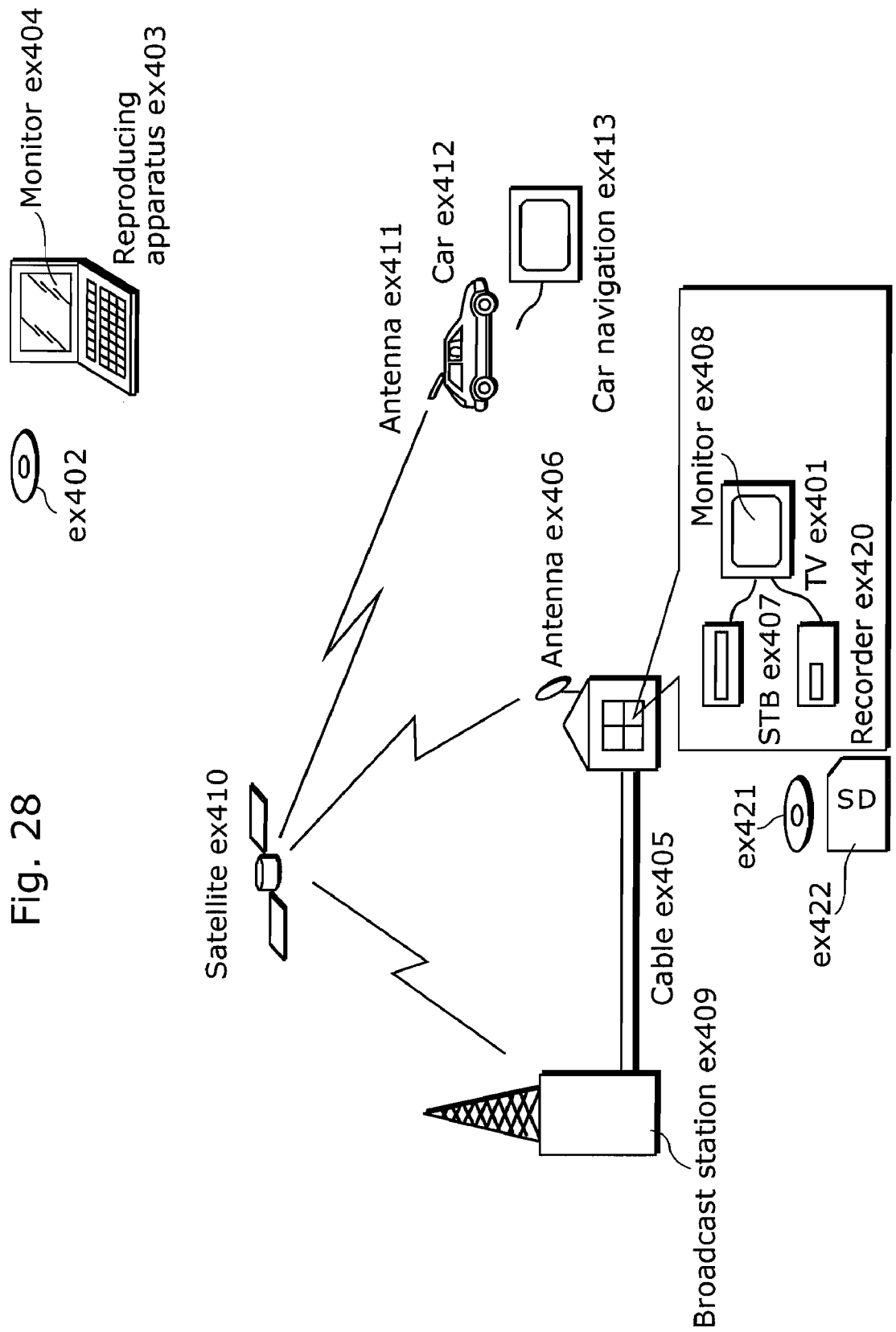
FIG. 28 is a diagram showing an example of a system for digital broadcasting.

Note that, in recent years, not just the example of the system, digital broadcasting with satellites and the terrestrial digital broadcast has been attracting attention. As shown in FIG. 28, at least one of the image coding apparatus and the image decoding apparatus according to the embodiments above can be incorporated into the digital broadcast system. More specifically, the coded bit stream of the video information in the broadcast station ex409 is transmitted to the communication or broadcast satellite ex410 via radio wave. The broadcast satellite ex410 transmits the radio wave for broadcasting, the radio wave is received in a household antenna ex406, and the coded bit stream is decoded by the devices such as a television (receiver) ex401 or a set top box (STB) ex407 and is reproduced. In addition, it is possible to mount the image decoding apparatus shown in the embodiments above on the reproducing apparatus ex403 which reads and decodes the coded bit stream recorded on the storage media ex402 such as CD and DVD and the like which is recording medium. In this case, the reproduced video signal is displayed in the monitor ex404. In addition, the image decoding apparatus may be mounted the cable ex405 for cable TV or the set top box ex407 connected to the antenna ex406 for the satellite/terrestrial broadcasting, and the image may be reproduced in the TV monitor ex408. Here, the image decoding apparatus may be incorporated into the television, not into the set top box. In addition, the moving picture can be reproduced in the display apparatus such as a car navigation ex413 in the car ex412 by receiving the signals from the satellite ex410 or from the station ex107 and the like.

Furthermore, the image signal may be coded in the image coding apparatus shown in the embodiments above and may be recoded into a recording medium. More specifically, a DVD recorder which records image signals on the DVD disk ex421, or the recorder ex420 such as a disk recorder which records the image signals on the hard disk are the examples. Furthermore, the image signals may be recorded on the SD card ex422. When the recorder ex420 includes the image decoding apparatus shown in the embodiments above, the image signals recorded on the DVD disk ex421 and the SD card ex422 may be reproduced and displayed on the monitor ex408.

Note that the configuration of the car navigation ex413 is, except the camera unit ex203 and the camera I/F unit 303 and the image coding unit ex312. Similar configuration is conceivable in the computer ex111 and the television (receiver) ex401.

In addition, terminals such as the mobile phone ex114 and the like may be implemented as, in three different implementation variations, other than a terminal of transmission/reception type which includes both a coder and a decoder, a transmission terminal which only includes the coder, and a reception terminal which only includes the decoder.

As described above, the image coding method, the image decoding method and the data management method shown in the embodiments above can be used in any devices and systems described above. Thereby the effects described in the embodiments can be achieved.

Furthermore, each of the functional blocks shown in FIGS. 2, 11, 12, 17, and 21 are typically achieved as a semiconductor device such as LSI or an integrated circuit. The LSI can be in plural single-function LSIs, or also can be in one integrated LSI. (For example, functional blocks except for memory can be integrated into one LSI.) The name used here is LSI, but it may also be called IC, system LSI, super LSI, or ultra LSI depending on the degree of integration.

Moreover, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

In the future, with advancement in semiconductor technology, a brand-new technology may replace LSI. The integration can be carried out by that technology. Application of biotechnology is one such possibility.

Furthermore, the cores of each of the functional blocks shown in the functional block diagrams in FIGS. 2, 11, 12, 17, 21 and each flowchart shown in FIGS. 1, 3, 10, 13A, 13B, 16, 20A, 20B and 15 are achieved by a processor or a program.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The image coding method, the image decoding method and the data management method according to the present invention is effective for dramatically improving the coding efficiency (increasing compression rate) when coding a still image or an image conventionally coded using the intra coding in the moving picture, and are useful as an image coding method, an image decoding method and a data management method in storage, transmission, and communication and the like.

What is claimed is:

1. An image coding apparatus comprising:
a search unit operable to search at least one second still image which is similar to a first still image from a group of images;
a coding unit operable to generate a predictive image for the first still image using the at least one second still image as a reference image and to generate a bit stream by coding a difference between the first still image and the predictive image; and
an addition unit operable to add, to the bit stream, information which indicates a location of the at least one second still image.

2. The image coding apparatus according to claim 1, wherein each of the at least one second still image includes a partial image of a subject corresponding to a subject image in the first still image.

3. The image coding apparatus according to claim 1, further comprising
a transformation unit operable to perform a transformation processing on the second still image,
wherein the transformation processing is processing for transforming the second still image so as to match at least one of a size of the partial image and an imaging angle of the partial image with a size of the subject image and an imaging angle of the subject image,
said coding unit is operable to generate the bit stream by performing a predictive coding on the first still image using the transformed image similar to the second still image as a reference image, and
said addition unit is operable to add, to the bit stream, transformation information which indicates the transformation processing performed on the second still image.

4. The image coding apparatus according to claim 1, further comprising
a storage unit operable to store a plurality of still images,
wherein said search unit is operable to search the second still image from the group of images which includes the plurality of still images stored in said storage unit.

5. The image coding apparatus according to claim 1,
wherein said search unit is operable to search the second still image from the group of images which includes still images on the Internet.

6. The image coding apparatus according to claim 1,
wherein said search unit includes:
a degree-of-similarity computation unit operable to compute a degree of similarity between each of candidate images included in the group of images and the first still image; and
a determination unit operable to determine the at least one second still image from the candidate images in order of the degree of similarity.

7. The image coding apparatus according to claim 6,
wherein said degree of similarity computation unit is operable to:
extract a plurality of first feature points each of which represents a feature of the first still image;
extract a plurality of second feature points each of which represents a feature of the candidate image;
judge pairs each of which is a pair of one of the first feature points and one of the second feature points which correspond each other; and
compute the degree of similarity in such a manner that the more the number of pairs is, the higher the degree of similarity becomes.

8. The image coding apparatus according to claim 6,
wherein said degree of similarity computation unit is operable to:
extract a plurality of first feature points each of which represents a feature of the first still image;
extract a plurality of second feature points each of which represents a feature of the candidate image;
judge pairs, each of which is a pair of one of the first feature points and one of the second feature points which correspond each other;
compute the transformation matrix, based on the pairs, for transforming each of the candidate images so that at least one of a size of the candidate image and an imaging angle of the candidate image matches a size of the first still image and an imaging angle of the first still image; and
compute the degree of similarity in such a manner that the lower the degree of transformation in the transformation is, the higher the degree of similarity becomes.

9. The image coding apparatus according to claim 6,
wherein said degree of similarity computation unit is operable to:
extract a plurality of first feature points each of which represents a feature of the first still image;
extract a plurality of second feature points each of which represents a feature of the candidate image;
judge pairs, each of which is a pair of one of the first feature points and one of the second feature points which correspond each other; and
compute the transformation matrix, based on the pairs, for transforming each of the candidate images so that at least one of the size of the candidate image and the imaging angle of the candidate image matches the size of the first still image and the imaging angle; and
compute the degree of similarity in such a manner that the larger the number of pairs and the smaller the degree of transformation are, the higher the degree of similarity becomes.

10. The image coding apparatus according to claim 1,
wherein said search unit is operable to search each of candidate images included in the group of images based on metadata, and
the metadata includes at least one of a keyword, imaging location information, and imaging date information.

11. The image coding apparatus according to claim 1,
wherein said search unit is operable to exclude a still image coded using another still image as a reference image from the at least one second still image.

12. The image coding apparatus according to claim 1,
wherein said coding unit is operable to code the first still image on a block-by-block basis, and
at least one block is coded in the predictive coding of the moving picture coding method using one of the second still images as the reference image.

13. The image coding apparatus according to claim 12,
wherein said coding unit includes:
a reference memory in which the at least one of second still image is stored;
a motion vector detection unit operable to detect a motion vector of the at least one block using the second still image in the reference memory as the reference image;
a subtraction unit operable to compute a difference between the at least one block and a predictive image as prediction residual, the predictive image obtained from the reference image based on the motion vector; and
a variable length coding unit operable to perform a variable coding on the prediction residual and the motion vector.

14. The image coding apparatus according to claim 1,
wherein said coding unit is operable to code the first still image on a block-by-block basis, and
at least one block is coded in the bi-predictive coding of the moving picture coding method using two of the second still images as reference images.

15. The image coding apparatus according to claim 4, further comprising:
a reception unit operable to receive a delete instruction for deleting the still image stored in said storage unit;
a judging unit operable to judge whether or not there is another still image coded using the still image which is a subject of the delete instruction; and
a notification unit operable to notify, when it is judged that there is the another still image, that there is the another still image.

16. The image coding apparatus according to claim 15, further comprising
a deletion unit operable to delete the still image when said reception unit receives the delete instruction again, in response to the notification.

17. The image coding apparatus according to claim 1, further comprising:
a designation unit operable to designate a first area in the first still image;
a specifying unit operable to specify a second area in the second still image corresponding to the first area; and
a completion unit operable to remove pixels in the first area and complete the removed first area with the pixels in the second area,
wherein said coding unit is operable to code the first still image on which the completion is performed by said completion unit.

18. The image coding apparatus according to claim 1, further comprising
a super resolution unit operable to change a resolution of the first still image to a high resolution using at least one of the second still image as a reference image,
wherein said coding unit is operable to code the first still image of which the resolution is changed to a high resolution.

19. An image decoding apparatus comprising:
an acquisition unit operable to acquire a bit stream and additional information which indicates a first still image;
an image acquisition unit operable to acquire a second still image indicated in the additional information; and
a decoding unit operable to generate a predictive image for the first image using the second still image as a reference image, and to add a prediction residual obtained from the bit stream indicating the first image and the predictive image to obtain the first still image.

20. An image coding method comprising steps of:
searching at least one second still image which is similar to a first still image from a group of images;
generating a predictive image for the first still image using the at least one second still image as a reference image;
coding, by generating a bit stream by coding a difference between the first still image and the predictive image; and
adding, to the bit stream, information which indicates a location of the at least one second still image.

21. An image decoding method comprising steps of:
acquiring a bit stream and additional information which indicates a first still image;
acquiring a second still image indicated in the additional information;
generating a predictive image for the first image using the second still image as a reference image; and
adding prediction residual obtained from the bit stream indicating the first image and the predictive image to obtain the first still image.

22. A semiconductor device comprising:
a search unit operable to search at least one second still image which is similar to a first still image from a group of images;
a coding unit operable to generate a predictive image for the first still image using the at least one second still image as a reference image and to generate a bit stream by coding a difference between the first still image and the predictive image; and
an addition unit operable to add, to the bit stream, information which indicates a location of the at least one second still image.

23. A semiconductor device comprising:

an acquisition unit operable to acquire a bit stream and additional information which indicates a first still image;

an image acquisition unit operable to acquire a second still image indicated in the additional information; and a decoding unit operable to generate a predictive image for the first image using the second still image as a reference image, and to output the first still image by adding a prediction residual obtained from the bit stream indicating the first image and the predictive image.

24. An image processing apparatus comprising:

a search unit operable to search at least one second still image which is similar to a first still image from a group of images;

a designation unit operable to designate a first area in the first still image;

a specifying unit operable to specify a second area in the second still image corresponding to the first area; and a completion unit operable to remove pixels in the first area and complete the removed first area with the pixels in the second area.

25. An image processing apparatus comprising a search unit operable to search at least one second still image which is similar to a first still image from a group of images, and a super resolution unit operable to change a resolution of the first still image to a higher resolution using the at least one second still image as a reference image.

* * * * *